United States Patent [19]
McQuinn

[11] Patent Number: 6,122,581
[45] Date of Patent: *Sep. 19, 2000

[54] MULTI-VARIABLE RATE DISPENSING SYSTEM FOR AGRICULTURAL MACHINE

[75] Inventor: Alvin E. McQuinn, Edina, Minn.

[73] Assignee: Ag-Chem Equipment Co., Inc., Minnetonka, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/247,248

[22] Filed: Feb. 9, 1999

Related U.S. Application Data

[63] Continuation of application No. 08/940,345, Sep. 30, 1997, Pat. No. 5,913,915.

[51] Int. Cl.[7] .................................................. A01L 7/00
[52] U.S. Cl. ............................................ 701/50; 701/213
[58] Field of Search ............................. 701/50, 207, 208, 701/213, 217, 23, 25; 239/302, 1, 69; 702/5

[56] References Cited

U.S. PATENT DOCUMENTS

| | | | |
|---|---|---|---|
| Re. 35,100 | 11/1995 | Monson et al. | 111/130 |
| 4,630,773 | 12/1986 | Ortlip | 239/1 |
| 4,918,190 | 4/1990 | Sheehan et al. | 56/34 |
| 5,220,876 | 6/1993 | Monson et al. | 111/130 |
| 5,355,815 | 10/1994 | Monson | 111/200 |
| 5,453,924 | 9/1995 | Monson et al. | 364/131 |
| 5,574,657 | 11/1996 | Tofte et al. | 364/524.18 |
| 5,646,846 | 7/1997 | Bruce et al. | 701/50 |
| 5,653,389 | 8/1997 | Henderson et al. | 239/69 |
| 5,704,546 | 1/1998 | Henderson et al. | 239/69 |
| 5,771,169 | 6/1998 | Wendte | 702/5 |
| 5,878,371 | 3/1999 | Hale et al. | 702/5 |

*Primary Examiner*—Tan Nguyen
*Attorney, Agent, or Firm*—Kinney & Lange

[57] ABSTRACT

An improved mobile agricultural products application system including a multi-variable rate dispensing system particularly adaptable for use in site-specific farming, wherein selected discrete crop input delivery information unique to selected on-board crop input storage devices, and/or crop input transport systems, and/or crop input dispensing points is combined with anticipated field reference point data obtained with a machine positioning system, e.g. "Dead Reckoning", GPS, and/or radar, and a computer, to direct independent functioning of selected on-board storage devices, material transport systems, crop input release mechanisms and/or dispensing point mechanisms to ensure stored crop inputs are released and combined to vary a prescription of delivered crop inputs in a direction substantially transverse to the direction of machine travel as the crop input applicator machine(s) travels over a predetermined geographic land area. The improved system can selectively and exclusively accommodate precise application of seeds, or can optionally accommodate seed application in combination with other crop inputs. The multi-variable rate dispensing system provides environmental advantages to all through enhanced resource management by more accurately and precisely placing crop inputs resulting in a significant reduction in wasted resources.

10 Claims, 12 Drawing Sheets

MULTI-VARIABLE RATE DISPENSING SYSTEM FOR AGRICULTURAL MACHINE

CROSS-REFERENCE TO RELATED APPLICATION(S)

This patent application is a continuation of U.S. patent application Ser. No. 08/940,345, entitled *Multi-variable Rate Dispensing System for Agricultural Machines,* filed Sep. 30, 1997, now U.S. Pat. No. 5,913,915.

BACKGROUND OF THE INVENTION

This present invention relates generally to agricultural product applicator systems, and more particularly to a multi-variable dispensing rate agricultural products (crop inputs) applicator system for controlling crop input dispensing points across a spreader boom, planter, seeder and various other crop input applicator devices substantially transverse to their direction of travel in response to a computerized control system which stores a digital soil map of the location of various soil types, topographical features, and/or characteristics such as nutrient levels, soil compaction, drainage or any other qualifying crop production characteristic.

Various agricultural product applicator systems and associated methods of control have been suggested at one time or another, but in each instance, these systems leave something to be desired. For example, there is a need for a variable rate applicator system that ensures agricultural products dispensed from a boom, planter, seeder or other crop input applicator device are accurately and precisely dispensed horizontal and substantially transverse to their direction of travel whenever it is desirable to deliver agricultural products (crop inputs) individually from multiple dispensing points attached to the applicator machine as the machine traverses a desired product delivery area. Significant changes in soil conditions, topographical features, and/or characteristics such as nutrient levels, soil compaction, drainage or other qualifying crop production characteristics, have been found by the present inventor, to occur even within a distance of a few feet. For example, it now known that fertility levels are a lot like surface topography. Although the fertility levels cannot be seen, they still exist. Therefore, the importance of tighter control of crop input application has and will continue to become more relevant and necessary. The agricultural industry has not yet recognized the necessity or even the existence of the aforesaid horizontal variation problem. In a few research situations, rapid changes in soil conditions have been noticed, but little or no consideration has been given to resolution of the problems related to accomplish accurate dispensing of crop inputs horizontal and substantially transverse to their direction of travel. This problem has been totally ignored by the agricultural industry because of the general consensus that even if such a problem exists, resolution of such a problem is virtually impossible. Therefore, in general, products (crop inputs) have been controlled variably in the linear mode of travel, i.e. direction of planting or application. Agricultural product applicator systems which utilize an estimated or average quantity and prescription value common to all dispensing points on a product applicator machine have been developed. Generally, these systems are limited to use of a cursor on a display device to locate reference points in front of a moving machine and then dispense crop inputs at the field reference points at a single predetermined variable delivery rate which is common to all dispensing points attached to the applicator machine. The point at which product flow is initiated is generally determined from factors including ground speed of the applicator machine and the total amount of time it takes from the moment of product flow initiated from onboard the applicator machine and the moment product is dispensed from either a wet boom, dry boom, or other type of dispensing device such as seeders and planters, for example.

A common system known to those skilled in the art of agricultural products (crop inputs) application includes an agricultural machine having a single bin containing planting products such as seeds or crop inputs application products such as herbicides, insecticides, fertilizer, anhydrous ammonia, various chemicals, or other crop input products. Some of these systems are ground-speed coordinated and start metering product from the product bin when the applicator machine reaches an anticipated field reference point, generally dispensing crop inputs in the linear mode of travel, i.e. direction of planting or application. These known machines presently utilize a single predetermined composite average or estimated variable dispensing rate which is common to all dispensing points across the spreader boom, planter, seeder, or other applicator device attached to the machine.

Still needed, but not available with variable rate product applicator machines and associated control systems presently known in the art is an agricultural products (crop input) applicator system which allows a variable rate product applicator machine to simultaneously dispense a plurality of planting products or crop inputs at a combination of different variable dispensing rates horizontally, from side to side, across a spreader boom, planter, seeder, or other applicator device as the applicator machine crosses anticipated reference points in a field as they occur. Such a need exists for variable rate product applicator machines having multiple product storage devices such as bins mounted upon the machine or having multiple conveyor and/or product flow devices or having multiple product dispensing point devices, all of which are responsive to a computerized control system which holds a digital soil map of the location of various soil types, topographical features, and/or characteristics such as nutrient levels, soil compaction, drainage or any other qualifying crop production characteristic. It can readily be appreciated that use of a single composite estimated or average variable machine delivery rate will be inadequate to provide for accurate and precise application of agricultural products where more than a single product, storage device, e.g. bin, or material transport system, e.g. conveyor, is used with a machine having multiple crop input dispensing points attached thereto, and where soil types and/or characteristics change rapidly in a direction transverse to the direction of machine travel. It will also be appreciated that use of a single composite average or estimated variable dispensing rate will be inadequate to provide for accurate and precise application of agricultural products (crop inputs) when variable rate applications are being made in response to premeasured field site conditions. Known systems generally under apply some crop inputs on one side while other crop inputs are over applied at the other side of the applicator, planter, or seeder device, resulting in misapplication of crop inputs as the machine crosses the field reference points. A better solution is to provide an applicator machine with a multi-variable rate dispensing system which is capable of taking into consideration the type of crop inputs, premeasured soil characteristics, desired prescriptions and quantities of crop inputs, nature and location of the individual machine crop input dispensing points employed, e.g. wet booms, dry booms, nozzles, conveyors, spinners, planters, drop tubes, injectors, etc., as well as the ground speed and direction of the machine. Such a multi-variable rate dispensing system must be capable of evaluating each field reference point which is unique to each applicator machine dispensing point in order to determine a unique crop input variable dispensing rate requirement for each agricultural products (crop inputs) dispensed from each dispensing point on the applicator machine. Using such a system will then prevent misapplication of the agricultural products (crop inputs) to a desired target area traversed by the variable rate applicator machine. Unless the premeasured crop input prescription and quantity requirement differences between individual field site locations are considered and coordinated, accurate and precise applications are impossible. The present invention provides a solution for the management and control of the aforesaid differences.

Modern applicator machine control systems typically have a host controller located within the operator cab of the machine, including a processor with associated input and output devices. The host is generally directly linked to at least one other controller which may also be located within the cab, and which is responsible for all communication to devices on the machine, such as shown in U.S. Pat. No. 4,630,773, issued Dec. 23, 1986, to Ortlip, entitled *Method and Apparatus for Spreading Fertilizer*, and U.S. Pat. No. Re 35,100, issued Nov. 28, 1995, to Monson et al., entitled *Variable Rate Application System*, both assigned to Ag-Chem Equipment Company, Inc. of Minnetonka, Minn., the Assignee of the present invention. The system disclosed in the '100 reissue patent comprises a controller accessing a soil map indicating a soil characteristic for each portion of the field. Field locations and status maps indicating current crop input level at various locations in a field to be treated are monitored by a control system. A crop input map is updated after a dispensing pass to provide a real-time record. Position locators for the machine in the field may include "Dead Reckoning", GPS, or LORAN systems, for example.

U.S. Pat. No. 5,355,815 discloses yet another closed-loop variable rate applicator system. The system operates by determining a soil prescription in near real-time and dispenses crop inputs to the soil scene as a fraction of the soil prescription. The '815 patent is also assigned to Ag-Chem Equipment Company, Inc. and is incorporated herein by reference in its entirety.

Another system is disclosed in U.S. Pat. No. 5,453,924, issued Sep. 26, 1995, to Monson et al., entitled *Mobile Control System Responsive To Land Area Maps*. This system expands on earlier known applicator machine controls systems including those heretofore assigned to Ag-Chem Equipment Company, Inc., by incorporating a network scheme which links a host controller positioned within the operator cab to multiple controllers located at various points on the machine external to the operator cab. All of the above patents are assigned to the Assignee of the present invention and are incorporated by reference in their entirety herein. The control systems referenced herein above describe systems which, when properly adapted with the inventive algorithmic software and associated control devices, may be used to practice the present invention.

BRIEF SUMMARY OF THE INVENTION

The limitations of the background art discussed herein above are overcome by the present invention which includes a multi-variable rate dispensing system adapted for use on variable rate crop input applicator machines, and particularly agricultural products (crop inputs) applicator machines having a plurality of crop input dispensing points operatively coupled thereto. As used herein, the term crop input applicator includes, but is not limited to any self-propelled or towed fertilizer spreaders, chemical applicators, planter devices, e.g. corn planter, seed drill devices, air seeders, air spreaders, and any dispensing devices that spread, apply and/or inject crop inputs, e.g. lime, crop protection agents, granular and liquid herbicides, insecticides, fertilizers, chemicals, anhydrous ammonia, nitrogen inhibitor, micronutrients, seeds, and any combinations thereof For example, the present invention could be used to apply different rates and/or varieties of seeds at different points on a variable rate crop input applicator machine if so desired. The present inventive multi-variable rate crop input applicator system addresses the problems associated with the unaccounted for inter-active effects of misapplied agricultural products (crop inputs) which result from use of a single composite estimated or average variable dispensing rate to simultaneously control the prescription and quantity of multiple agricultural products dispensed from multiple dispensing points attached to a variable rate product applicator machine. The present inventive multi-variable rate product applicator system also addresses the problems associated with the unaccounted for effects of the aforesaid single composite estimated or average variable dispensing rate machines where a single product, and/or single product storage device, and/or a single material transport system, in combination with a uniform spreading multi-point dispensing system is employed. Presently known product applicator systems are limited by their structures and methods to use of a single composite estimated or average system crop input variable delivery rate which is common to every dispensing point across the application machine, regardless of whether a single or multiple crop inputs are being applied. In contrast, the present multi-variable rate dispensing system is a digital map coordinated system which is customized to ensure accurate and precise application of agricultural products (crop inputs) to a desired target area being traversed by the application machine, regardless of crop input prescription and quantity requirement differences at individual dispensing point locations across the machine. A computerized control system is provided which holds a digital map of the location of various soil types, topographical features, and/or characteristics such as nutrient levels, soil compaction, drainage or any other qualifying crop production characteristic, in the field to be treated, and is responsive to machine locating devices for determining the location of the machine in the field, looking up the soil type, topographical features, and/or qualifying crop production characteristics of the soil the machine is currently over based upon its location, and simultaneously adjusting the crop input prescription and quantity for each individual dispensing point in response thereto. Those applicator systems known in the art have been controlled variably in the linear mode of travel, i.e. direction of planting or application. The present inventive map coordinated system will allow for variable input control in the horizontal plane from one side to the other, either by section control (several dispensing points grouped together) or through individual dispensing point control. The increased precision and accuracy provided by the present invention also results in significant environmental advantages and gains by all as a consequence of reduced waste related to resource usage due to improved placement of crop inputs. As used herein, ground-speed or machine speed means machine velocity. Crop input release point means the actual point where a stored product is discharged from a product storage device via a product metering device. Crop input dispensing point means the actual point where a crop input product is discharged from the application machine. The inventive multi-variable rate dispensing system can also be adapted to consider crop input flow differences due to distinctions in the viscosity and frictional flow characteristics for the different agricultural products crop inputs being dispensed from the applicator machine.

Use of the present multi-variable rate dispensing system allows each applicator machine to be customized to provide the optimum results for the end users. For example, any specific machine can be customized by tailoring the crop input variable delivery rate for any desired dispensing point or group of dispensing points across the machine from side to side and associated metering devices attached to the applicator machine in response to a computerized control system which holds a digital soil map of the location of various soil types, topographical features, and/or characteristics such as nutrient levels, soil compaction, drainage or any other qualifying crop production characteristics. Variable prescription and quantity requirements for any particular dispensing point may differ significantly from variable prescription and quantity requirements which are associated with a different dispensing point which is proximal or physically located only a few feet away from that particular dispensing point. Therefore, in any given situation, it may be necessary to instruct the crop inputs dispensed from adjacent dispensing points to flow at different variable rates simultaneously. When utilized for planting or seeding applications, it may also be necessary to instruct different points on the machine to dispense different varieties of seeds and/or vary the rate of seeds to be dispensed there from. It will be readily appreciated that the present invention can be sued exclusively to control the rates and/or variety of seeds dispensed from the machine in a direction that is transverse to the direction of machine travel. Controlling these variable delivery rate differences is necessary when crop inputs are simultaneously dispensed from different dispensing points on the application machine, each delivering a unique and distinct prescription and quantity of crop inputs in response to a computerized control system which holds a digital soil map of the location of various soil types, topographical features, and/or any qualifying crop production characteristics in the field to be treated.

While today, grid samples and other agronomic information are most commonly taken in two acre and above land increments, it is anticipated by the present inventor that conducting of a much more intense level of soil testing, e.g. tissue sampling, as well as implementation and use of other systems to determine crop input requirements at a given location will become desirable, viable and economically feasible. New and evolving methods of computer analysis will provide much more detailed and accurate data. Even now, yield monitor data is collected in real time and can be used to help establish field site specific crop input requirements. Significant changes in soil conditions, topography, and/or qualifying crop production characteristics, have been found by the present inventor, to occur even within a distance of a few feet, for example. Therefore, the importance of tighter control of crop input application has and will continue to become more relevant and necessary.

The present inventive multi-variable rate dispensing system therefore provides a vast improvement over product application systems known in the art which use cursor anticipation devices and methods tied to a single fixed composite estimated or average variable dispensing rate for a moving applicator machine to provide some increase in accuracy and precision when dispensing agricultural products (crop inputs). The aforesaid improvement is the result of providing a system, as stated herein before, in which each specific dispensing point or group of dispensing points on the applicator machine is customized with its own precise unique variable dispensing rate thereby ensuring that application of any product to be dispensed is perfectly matched with the crop input prescription and quantity requirements for the field reference point unique to each respective dispensing point or group of dispensing points. The novel multi-variable rate dispensing system has a computerized control system which holds at least one digital soil map of the location of various soil types, topographical features, and/or characteristics such as nutrient levels, soil compaction, drainage or any other qualifying crop production characteristics, in the field to be treated and is responsive to machine location devices for determining the location of the machine in the field, retrieving the type, feature, and/or qualifying crop production characteristics of the soil each dispensing point is currently over based upon its location, and adjusting the rate and prescription of crop inputs dispensed from each respective dispensing point respectively. In this way, each product (crop input) is accurately and precisely dispensed for a specific target area of predetermined conditions, all based upon formerly measured conditions and values for that certain target area.

In one aspect of the present invention, the construction and arrangement is employed wherein a product applicator multi-variable rate dispensing system is programmed relative to individual characteristics of an individual variable rate agricultural products (crop inputs) applicator machine, i.e. location, number, and type of individual and distinct dispensing point devices, e.g. spray nozzles, spreading wheels, injection tubes, etc.

In yet another aspect of the present invention, the construction and arrangement is employed wherein a product applicator multi-variable rate dispensing system is employed to consider individual characteristics of one or more attached variable rate applicator machines such as a towed machine or multiple units, side by side or towed in tandem.

A feature afforded by the present invention is improved precision and accuracy of product dispensation including a desired mix and prescriptive quantity of product delivered at an anticipated location of known conditions based upon formerly measured conditions and values at the anticipated location when the variable rate product applicator machine arrives at the desired target location in a field.

Another feature afforded by the present invention is the provision of a multi-variable rate dispensing system that is adaptable for use with any type and combination of one or more variable rate applicator machines.

Yet another feature afforded by the present invention is the provision of a multi-variable rate dispensing system which allows any desired variable rate product applicator machine or combination of such applicator machines to be adapted for precision applications of crop inputs. Such modifications will maintain the integrity of the product application process in any manner.

Still another feature afforded by the present invention is the provision of a multi-variable rate dispensing system which is adaptable via algorithmic software for use with diverse variable rate product applicator machines, such as between a powered variable rate applicator machine and any combination of one or more towed machines, or between different and distinct variable rate applicator machines, all while preserving the integrity of the product application process associated with the machine.

Still another feature afforded by the present invention is the provision of a system resulting in environmental gains for all due to reduced wasting of resources as a consequence of greater accuracy and placement, i.e. place the required prescriptions and quantities of crop inputs where it is needed and will be used, of those resources, e.g. seed, fertilizer, farm chemicals, and other crop inputs.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION

Figure 10:
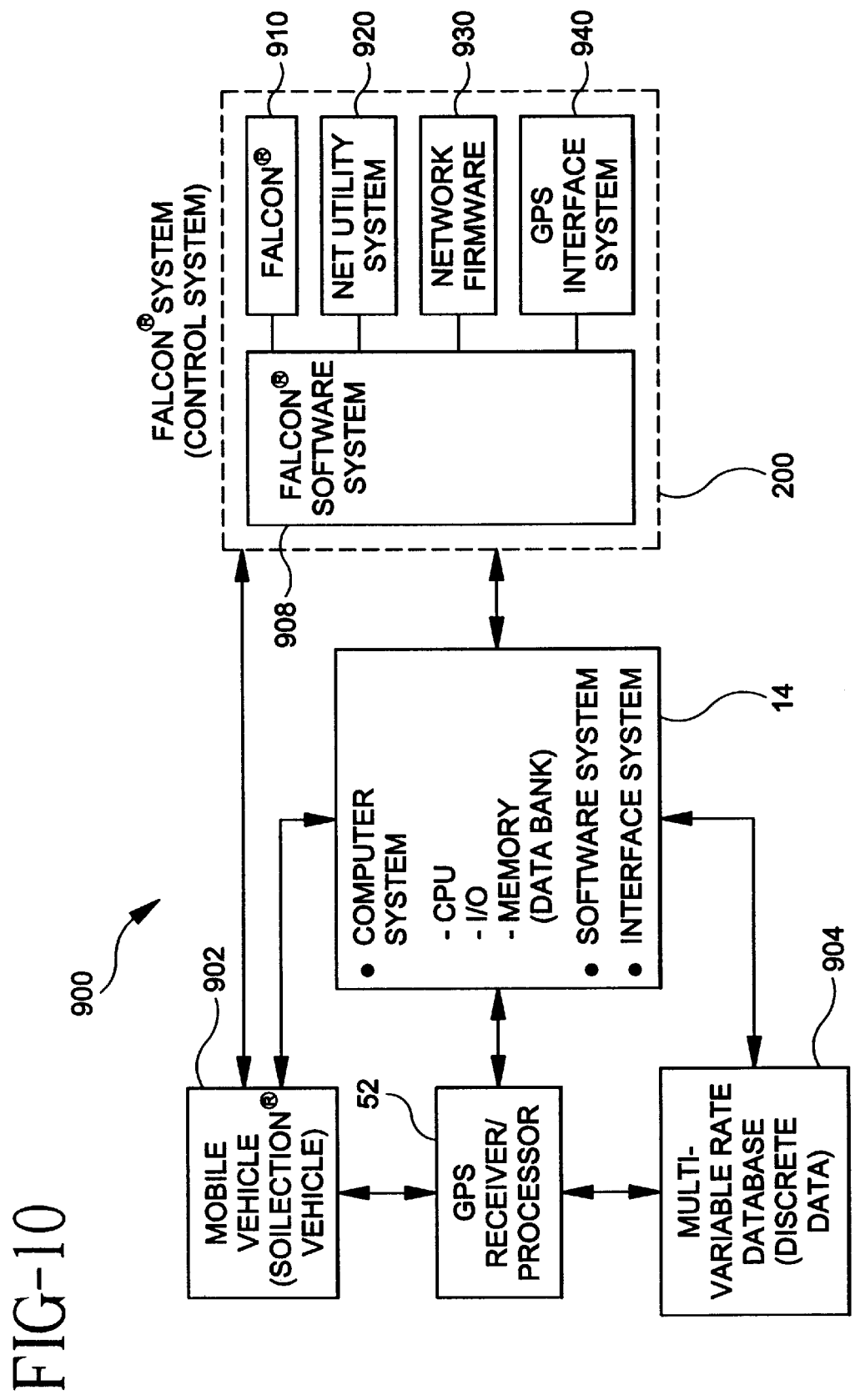
FIG. 10 is a simplified block diagram illustrating implementation of the present multi-variable rate dispensing system onboard a SOILECTION® machine having a FALCON® control system.

The preferred embodiments described as follows, address the long felt need by those in the agricultural industry to provide a digitized map coordinated variable rate planting and crop input product application system capable of accurately and precisely dispensing one or more agricultural products (crop inputs) simultaneously in a plurality of desired mixes and/or prescriptive quantities at a plurality of anticipated field locations when the machine dispensing points arrive at their respective anticipated locations in a field. In accordance with the preferred embodiment of the present invention, and with particular attention being directed to FIG. 1, a simplified block diagram illustrating one embodiment of a multi-variable rate dispensing system 50 suitable for implementing multiple crop input dispensing point control for a plurality of dispensing points 80 in response to a digitized map based upon premeasured field site conditions is shown to include a host computer 14, a GPS (Global Positioning System) receiver 52, and a radar device 54. The GPS is an accurate three-dimensional global positioning satellite system that provides radar positioning and navigation needs for the product application machine. GPS systems are known to those skilled in the art of satellite positioning systems and will therefore not be discussed in great detail except as made reference to herein after. The present invention is compatible for use with "Dead Reckoning" systems and satellite positioning systems such as AgNav™, Navstar Global Positioning System, Differential GPS Systems and other GPS based or equivalent systems to cooperatively update a resident positioning and navigation data base on a real-time basis. Generally, the GPS is initiated when the receiver 52 starts to track pseudorandom noise from multiple satellites and generates GPS data which is subsequently used by the machine control system, e.g. FALCON® to estimate time of arrival values for the machine to arrive at an anticipated location in a field, for example. A more detailed description of a GPS system can be found in U.S. Patent Application to Robert J. Monson, filed Jan. 22, 1996, entitled *AUTOMATIC TOPOGRAPHICAL MODEL GENERATION METHOD AND APPARATUS*, which is incorporated by reference in its entirety herein. Working in combination with one another, the GPS receiver 52, radar device 54, and host computer 14, then track and anticipate product application crop input reference points in a field, utilizing machine location, speed, and direction data. The host computer 14 also works in combination with a control system such as depicted in FIG. 10 to form a computerized control system which holds at least one digitized soil map of the location of various soil types, topographical features, and/or characteristics such as nutrient levels, soil compaction, drainage or any other qualifying crop production characteristic, in the field to be treated and which is responsive to the aforesaid location, speed, and direction data for determining the location of the machine in the field, retrieving the type, feature and/or qualifying crop production characteristic each dispensing point is currently over based upon its respective location, and adjusting the rate and/or prescription of crop input delivery in response thereto.

Figure 1:
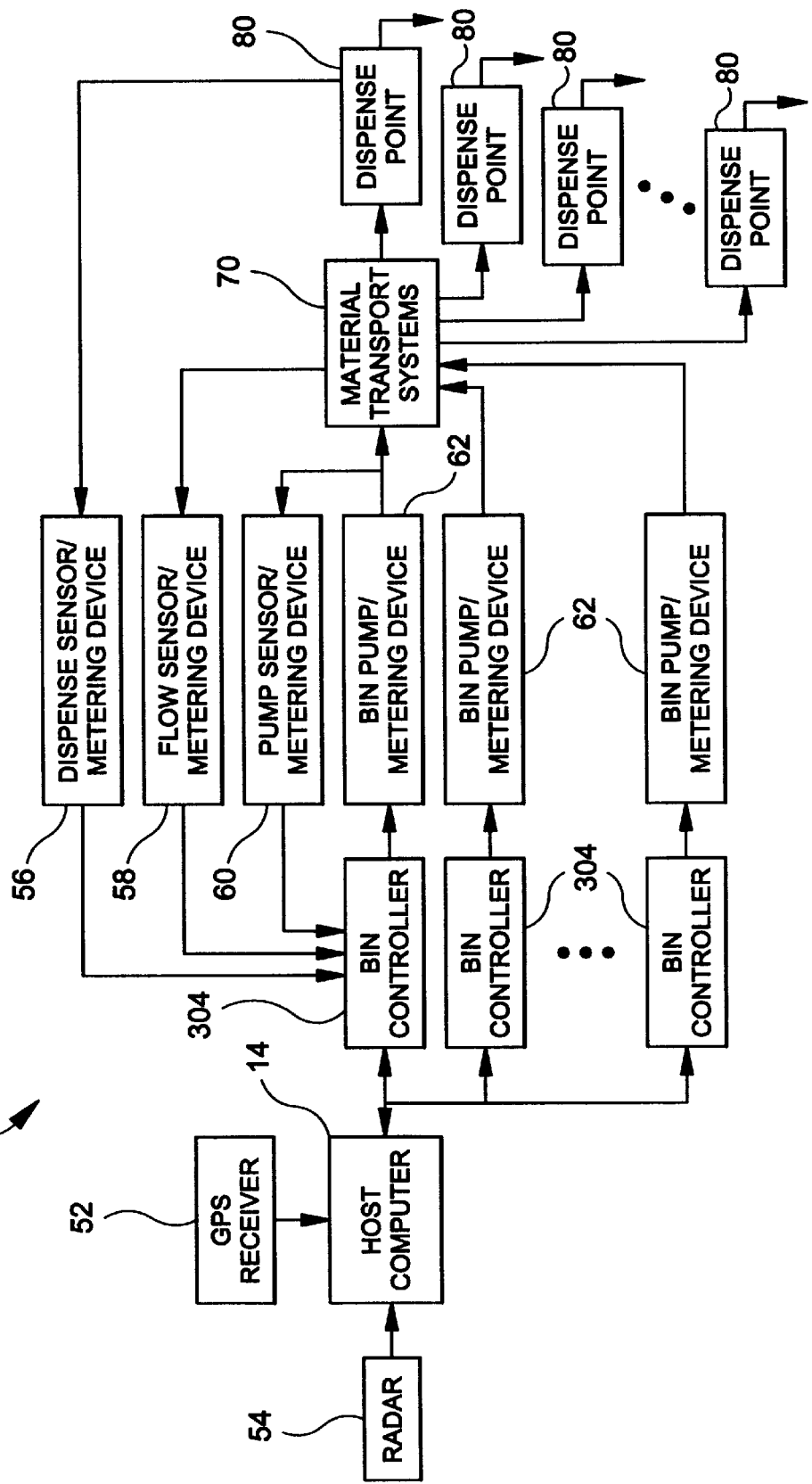
FIG. 1 is a simplified block diagram illustrating one embodiment of a multi-variable rate dispensing system suitable for implementing control of crop input delivery rates and prescriptions for individual or groups of dispensing points relative to their own unique field site in accordance with the present invention.

Looking again at FIG. 1, the multi-variable rate dispensing system 50 can be seen to have multiple products (crop inputs) dispensing points 80 and associated metering devices 62. Heretofore, known variable rate crop input delivery has been accomplished by provision of a single variable dispensing rate function incorporated into the application machine control system software. It has been accepted by some in the agricultural industry, that use of a single variable rate crop input delivery process will adequately and effectively eliminate product spreading inaccuracies, even when spreading multiple products and/or utilizing multiple dispensing points 80 dispersed horizontally transverse to the linear direction of machine travel. The present inventor has found however, that product spreading inaccuracies are often unacceptable, especially when spreading or dispensing multiple products, or products stored in multiple storage devices attached to a variable rate product application machine or any multiple combination of such applicator machines thereof having multiple dispensing points 80 distributed horizontally transverse to the linear direction of applicator machine travel. The foregoing spreading and/or dispensing inaccuracies also result when utilizing a single product storage device and/or when delivering a single crop input from a plurality of dispensing points 80 which are distributed substantially horizontally transverse to the linear direction of variable rate product application machine travel. Site-specific crop input requirements and interrelated conditions often require modifications to crop input delivery rates and/or prescriptions at individual dispensing points 80 as an application machine traverses a field to be treated. Today, such interrelationships are not being considered by those familiar with site-specific agriculture. It is anticipated by the present inventor that recognition and appreciation of the aforesaid interrelationships will become more clear as more intense evaluations by those skilled in the art are consummated. Presently a variable rate crop input application machine may inaccurately apply one or more of the products (crop inputs) to the ground a few feet away from an anticipated reference point at which the one or more crop inputs are correctly dispensed. Such inaccuracies have been found by the present inventor to occur because significant differences in site-specific conditions features, and/or qualifying crop production characteristics can easily occur within a distance of only a few feet. Taking into consideration the cost of chemicals, environmental concerns, and various agricultural products (crop inputs), as well as the depressed product yields which can result from improper application of crop input mixes and prescriptive quantities, a need presently exists for an improved variable rate delivery system. Such a system must be capable of taking into consideration, the individual dispensing rate requirements for each dispensing point 80 or group of dispensing points 80 attached to a variable rate crop input application machine, and ensure that the crop input dispensing process associated with each product (crop input) dispensing point 80 or group of dispensing points 80 attached to the application machine is individually controlled as the machine traverses a field. The aforesaid individual variable rate dispensing point control will ensure a desired prescription and quantity of crop inputs is delivered to the exact field point to be treated which is unique to each dispensing point 80 or group of such dispensing points 80. This process then contrasts with presently known application systems where the product delivery processes for all product dispensing points attached to the application machine are at best simultaneously sharing a common variable crop input delivery rate, but most often completely ignored.

With continued reference to FIG. 1, the present multi-variable rate dispensing system 50 also may have incorporated additional metering devices including, but not necessarily limited to storage bin release point sensors 60, crop input flow meters and sensors 58, and/or dispensing point meters and sensors 56. These metering devices 56, 58, 60, 62 are used to control and measure the product flow rates at different points within the multi-variable rate dispensing system 50. For example, product flow from each storage bin is initiated by an associated bin controller 304 when instructed via host computer 14 to actuate an associated metering device 62. It will be appreciated that any metering device, i.e. bin pump 62 can be individually controlled to meter (release) its crop input at a variable rate which is different from any other bin pump 62 metering rate within the multi-variable rate dispensing system 50. Likewise, the multi-variable rate dispensing system 50 may have incorporated one or more material transport systems 70 interconnected to product storage devices located at different points on the variable rate application machine or multiple combinations of machines thereof. Such material transport systems 70 and/or structures can also be individually controlled to create different product flow rates throughout the system 50. Similarly, multiple dispensing points 80 may also be incorporated at different physical machine locations, as stated above. Such different physical locations will add to complexities in individual products (crop inputs) dispensing rates controlled via control points 304 within the multi-variable rated dispensing system 50. For example, it is known that wet booms and dry booms are commonly used to spread agricultural products (crop inputs) onto the ground as a spreading machine traverses a field. These booms generally have multiple product dispensing points 80 dispersed over the entire length of the booms. Thus, products to be spread onto a field through such booms will exit the product dispensing points 80 simultaneously or sequentially at distinct field locations associated with individual dispensing points 80 as the crop input reaches each dispensing point 80. The present inventor has found that along any boom, major changes in conditions, topographical features, and/or qualifying crop production characteristics, as well as application requirements stemming from correctable conditions, can occur within a distance of one to ten feet. Under such varying conditions, features, and/or characteristics, each dispensing point 80 within the boom will then have a unique and distinct variable crop input dispensing rate and/or prescription requirement dependent on the physical machine location of the dispensing point 80 relative to a common machine reference point. The present multi-variable rate system 50 can be adapted for use with appropriate spray nozzle controls to meter a plurality of spray nozzles in sections or independently, thereby controlling the variable crop input delivery rates and/or prescriptions associated with each respective dispensing point 80 or group of dispensing points 80.

The present invention is not so limited however, and it will readily be appreciated that any variable rate product application machine having an onboard computer 14 and a machine tracking system such as a GPS receiver 52 in combination with a radar device 54 can be adapted to operate in conjunction with the present multi-variable rate dispensing system 50, regardless of the crop inputs to be dispensed, location, nature and type of crop input storage devices, controller devices, metering and sensor devices, material transport mechanisms and devices, crop input release points and dispensing points. The present multi-variable rate dispensing system 50 can easily be customized to work with any one or more variable rate product application machines, powered or towed, including combinations thereof, using either manual or automatic data entry. Each distinct dispensing point 80 or group of dispensing points 80 can be identified and appropriate data manually entered into the host computer 14 algorithmic software data base via a keyboard, or preprogrammed for example; or optionally, the multi-variable rate control system 50 can automatically interrogate the machine upon start-up to determine the number, type and location of each distinct dispensing point 80 and associated metering devices 56, 58, 60, 62 attached to the machine.

It will readily be appreciated that every variable rate crop input application machine has its own system of electronics, hydraulics and control mechanisms which may be unique unto itself or common to a family of variable rate application machines. The present inventive system and method takes these machine characteristics into consideration to control the necessary electronics, hydraulics and control mechanisms to ensure accurate combinations and precise placement of crop inputs are achieved thereby elevating state of the art variable rate application technology to a higher level. For example, the present inventive multi-variable rate dispensing system incorporates a computerized control system which holds one or more digital soil maps of the location of various soil types, topographical features, and/or characteristics such as nutrient levels, soil compaction, drainage or any other qualifying crop production characteristic in the field to be treated and is responsive to machine location devices for determining the location of each dispensing point in the field, retrieving the type, feature, and/or characteristic each respective dispensing point is currently over based upon its respective location, and adjusting the rate of delivery and prescription of crop inputs delivered from each dispensing point in response thereto.

Figure 2:
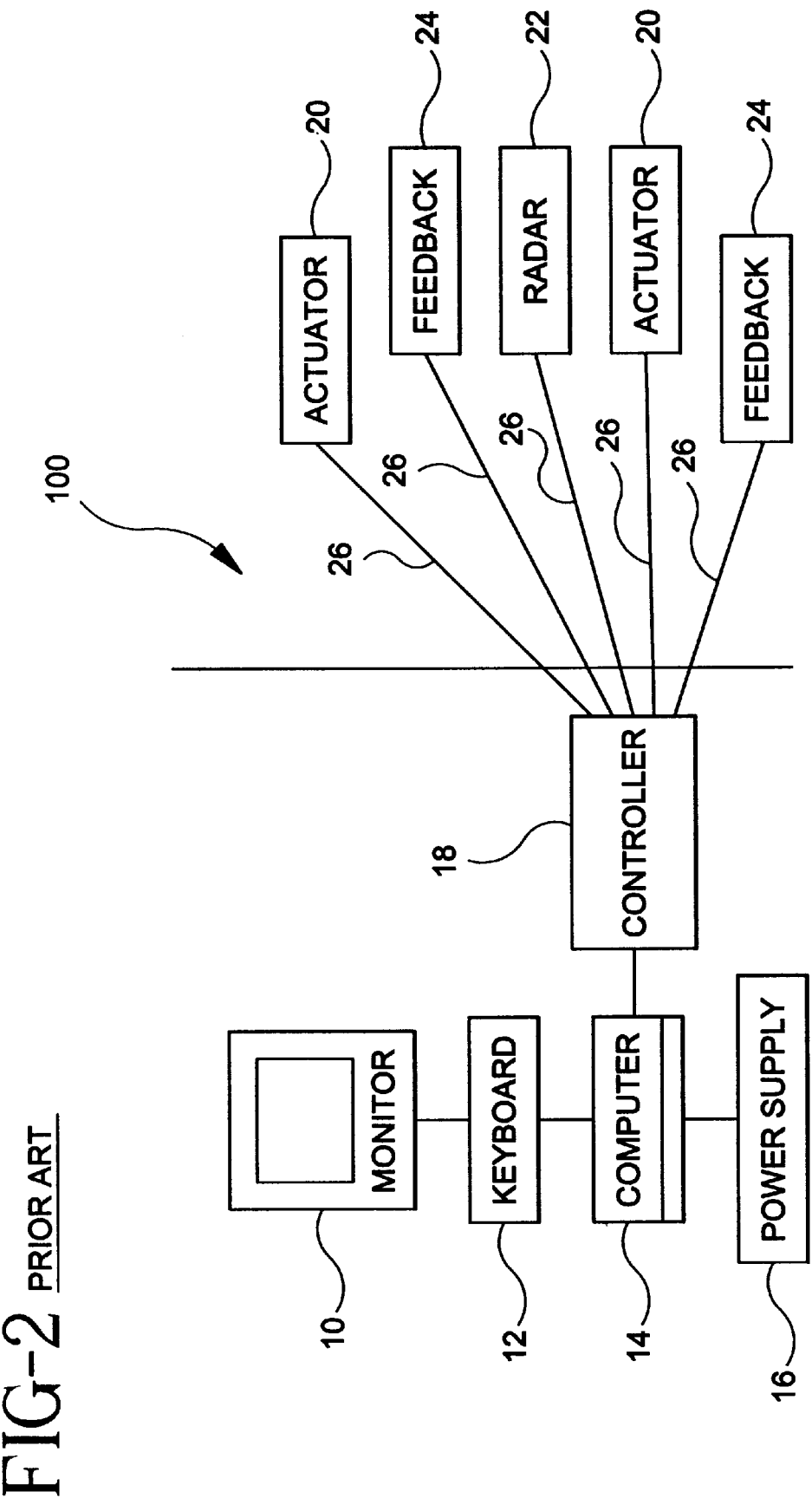
FIG. 2 is a simplified block diagram illustrating a variable rate product application machine control system disclosed in the prior art which may be adapted for use with the present multi-variable rate dispensing system depicted in FIG. 1.

Making reference now to FIG. 2, one control system 100, known in the art, is illustrated having a cab mounted host computer 14, keyboard 12, monitor 10, and a single controller module 18. The controller module 18 is coupled via communication cables 26 to distinct actuator devices 20 and feedback devices 24. As stated herein above, the location, crop input prescriptions and quantities, and other related data associated with each dispensing point 80 or group of dispensing points 80 can be entered manually via a keyboard 12, preprogrammed, or automated to communicate the necessary dispensing point 80 data into a host computer 14 data base. For example, selected portions of the aforesaid data can be retrieved from digitized field condition maps, as referenced and discussed herein above. When used in conjunction with a GPS receiver 52 and/or a radar device 54, the computer 14 can be programmed in accordance with the present invention such that as the variable rate machine traverses the field to be planted or apply crop inputs, each actuator 20 will be individually and distinctly actuated automatically to continuously meter and vary the flow of crop inputs emerging from its respective storage device and subsequently emerging from its associated product dispensing point(s) 80 or group(s) of dispensing points 80 attached to the machine in response to the digitized map data. In this manner, the present invention will, relative to predetermined digitized map data, allow for variable input control in the horizontal plane from one side to the other, either by section control (several dispensing points 80 grouped together) or through individual dispensing point 80 control. It will readily be appreciated that the present invention will accommodate variable rate control in a horizontal plane transverse to the direction of machine travel for a planter or seeder to control the rate and/or variety of seeds dispensed at different points on the application machine, if so desired by the machine operator.

Figure 3:
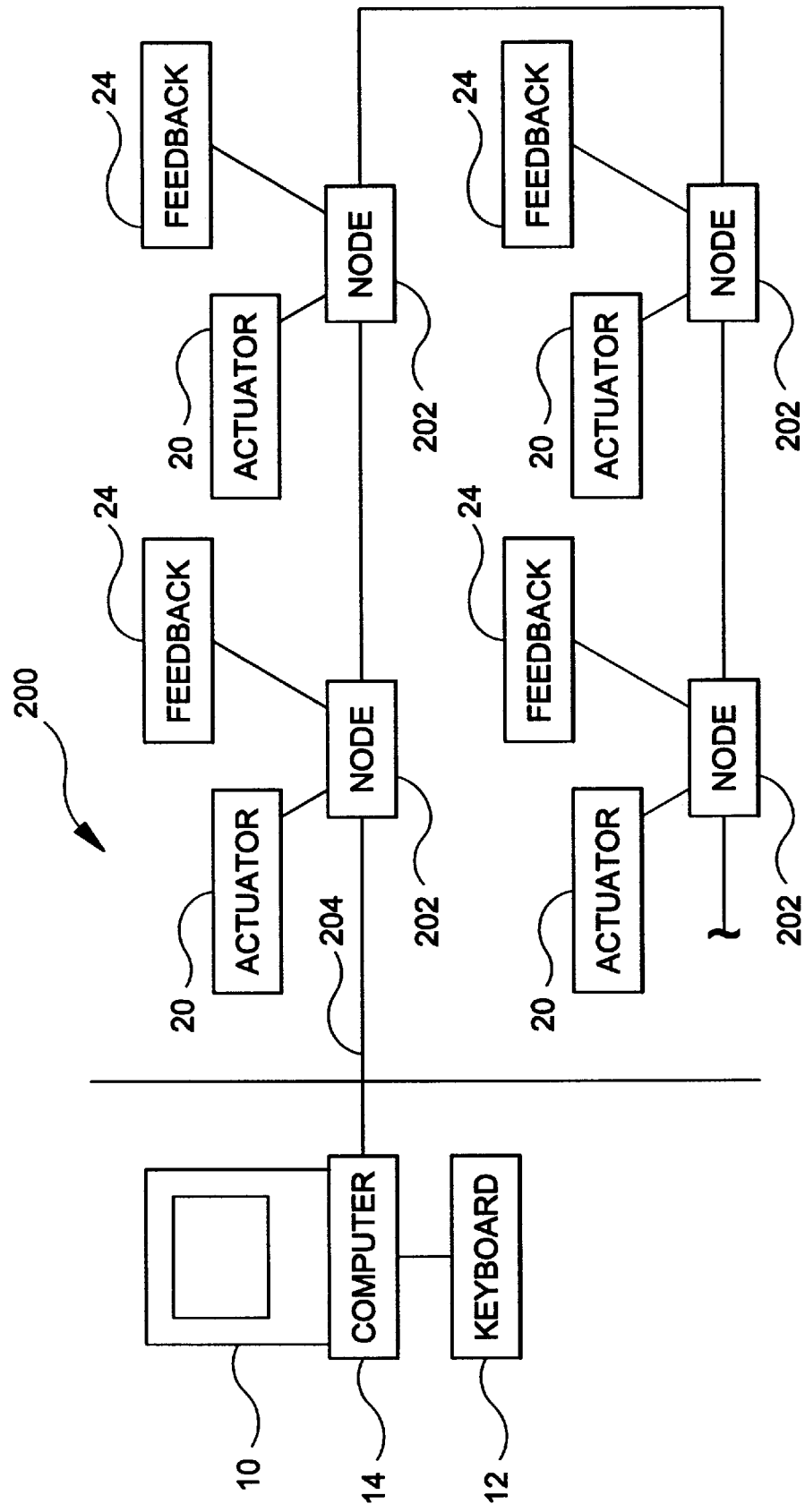
FIG. 3 is a simplified block diagram illustrating a FALCON® variable rate product application machine control system which may be adapted for use with the present multi-variable rate dispensing system depicted in FIG. 1.
Figure 4:
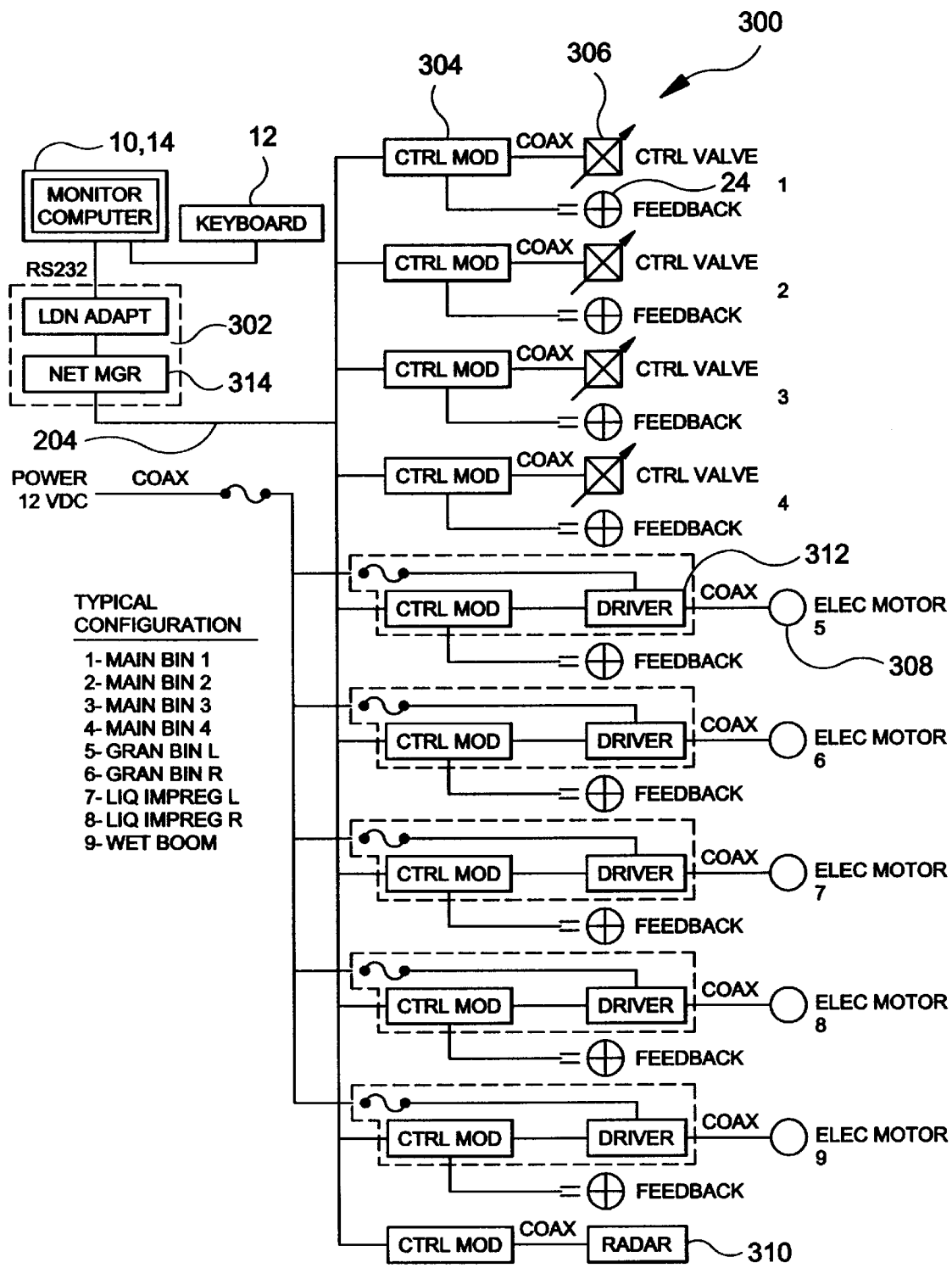
FIG. 4 is a more detailed block diagram of the FALCON® variable rate product application machine control system illustrated in FIG. 3.

Looking now at FIG. 3, another control system 200 known as FALCON® available from Ag-Chem Equipment Co., Inc. of Minnetonka, Minn., is illustrated having a cab mounted host computer 14, keyboard 12, monitor 10, and further having multiple independent nodes 202. Each node 202 can include a unique and distinct control module 304 capable of two-way communication between the host computer 14 and the respective node 202 and also between the node 202 and an actuator 20 such as a bin pump 62, or between a particular metering device or set of metering devices 56, 58, 60 and a respective node 202. Upon machine startup, the host computer 14 will prompt individual control modules 304 to interrogate each metering device 56, 58, 60, and/or any other type of metering device such as a bin pump 62, associated with that particular control module 304 via a feedback network 24 such as illustrated in FIGS. 2 and 4. Before the machine is put into operation, the machine can be operated in a fully functional mode at a designated site such as the manufacturing plant to determine appropriate dispensing point 80 information necessary to customize the machine according to the present invention. During the customization process, each control module 304 can interrogate each metering device 56, 58, 60 and/or other device stated herein above necessary to properly customize the application machine. Presently, the best mode for implementing the present invention makes use of predetermined dispensing point 80 information that is entered into the algorithmic software data base. However, it is anticipated by the present inventor that the dispensing point 80 information described herein above may also be automatically entered into the data base via incorporation of appropriate metering devices 56, 58, 60 as well as algorithmic software within the control modules 304 and/or the host computer 14. The control modules 304 will then communicate the necessary dispensing point 80 data to the host computer 14 where the data is stored in a data base for use by the present inventive multi-variable rate dispensing system 50. As stated herein before, the control system 300 can be adapted to include a GPS receiver 52 such that the host computer 14, GPS receiver 52, and/or radar device 54 function to track and anticipate a plurality of field reference points in real time, utilizing machine location, speed, and direction data in a manner that allows the host computer 14 and control modules 304 to individually vary the crop input dispensing rate at each dispensing point 80 or group(s) of dispensing points 80 identified on the machine in accordance with the present invention. Specifically, the computerized control system 300 stores one or more digital soil maps of the location of various soil types, topographical features, and/or characteristics such as nutrient levels, soil compaction, drainage or any other qualifying crop production characteristic, in the field to be treated and is responsive to the aforesaid machine location, speed and direction data for determining the location of the machine dispensing points 80 in the field, retrieving the aforesaid type, feature and/or characteristic data the respective dispensing point 80 is currently over based on its location data, and adjusting the rate of crop input delivered and prescription of crop input delivered at each respective dispensing point 80 in response thereto. As stated herein above, crop inputs are determined by the application machine operator and may include, but are not limited to, products such as herbicides, insecticides, fertilizer, anhydrous ammonia, and various chemicals. Crop inputs may also include or be limited to seeds exclusively, to accommodate planter control in accordance with the present invention. Control system 300 can optionally be adapted to operate in accordance with the present invention using a "Dead Reckoning" system, as stated herein above. The control systems 100, 200, 300 described herein are disclosed in more detail in the '924 patent referenced herein before and incorporated in its entirety by reference herein, and so further details will not be discussed to preserve clarity and brevity.

Figure 5:
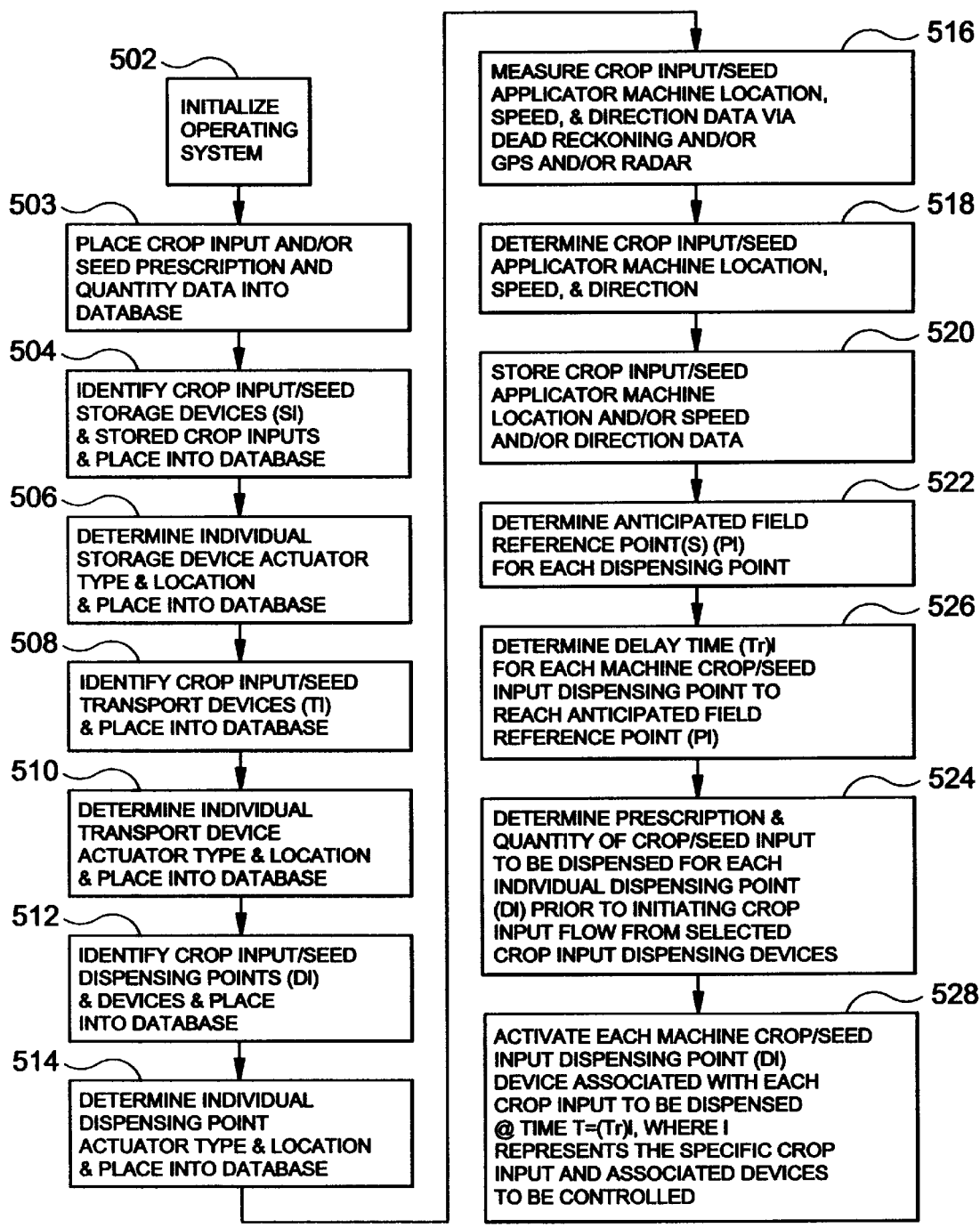
FIG. 5 is a simplified flow diagram illustrating operation of the present inventive multi-variable rate dispensing system to simultaneously control a plurality of agricultural products (crop input) dispensing points attached to a product application machine to vary a prescription of delivered crop inputs in a direction substantially transverse to a direction of machine travel.

FIG. 5 is a simplified flow diagram illustrating operation of the present inventive multi-variable rate dispensing system 50 to simultaneously control a plurality of metering devices 306, 308 attached to a variable rate product application machine such that each individual dispensing point 80 or group of dispensing points 80 will operate to deliver crop inputs to a predetermined field site at a unique variable rate in accordance with prescription and quantity data via a digitized map, for example. Starting with block 502, the host computer 14 and/or the control modules 304 attached to the application machine are initialized by activating the system 50, thereby actuating the operating system containing the software algorithms discussed hereinafter. As used herein, the words "software algorithms" mean algorithmic programs used to direct the processing of data by a computer or data processing device. Upon initialization, the predetermined digitized map crop input prescription data and related crop input quantity data for the field to be treated are entered into a data base (depicted as 904 in FIG. 10), which is stored in a data storage device (shown as a portion of computer 14 in FIG. 10) as depicted in block 503. The aforesaid data entry is presently performed manually but may optionally be automatically performed via appropriate algorithmic software and control devices as stated herein before. Presently, the aforesaid prescription and quantity data is preprogrammed into the algorithmic software data base along with the application machine signature data described herein below. The prescription and quantity data can then be extracted by the multi-variable rate dispensing system data processing device(s) 14, 304 for directing the algorithmic software to control the desired machine actuators 20, 306, 308 such that each field reference point is accurately and precisely treated with the desired prescription and quantity of crop inputs. Following the prescription/quantity data entry procedure depicted in block 503, each specific crop input storage device, i.e. bin (single and/or multi-compartment), tank, hopper, box, etc., and any crop inputs stored therein are identified as shown in block 504. The characteristic (signature) data for each crop input and storage device attached to the applicator machine is then placed into the data base 904, also shown in block 504. Following entry of the aforesaid crop input and storage device data into the data base 904, the type and location of each associated metering device actuator 20, 306, 308 is identified and placed into the data base 904 as shown in block 506, using any of the aforesaid manual, automatic, or preprogrammed data entry processes. Each agricultural products (crop input) transport device, i.e. conveyor, spray boom (dry and/or wet), supply tube, auger, etc., is next identified as shown in block 508 and the identification data is also stored in the data base 904. The type and location of each transport device actuator 20, 306, 308 is then identified and placed into the data base 904 as shown in block 510. Similarly, the type and location of each dispensing point 80 or group of dispensing points 80, e.g. spray nozzle(s), spreading wheel(s), injection tube(s), etc. and associated actuator device(s) 20, 306, 308 is identified and placed into the data base 904 as shown in blocks 512 and 514. During the application process, the aforesaid data is extracted from the data base 904 and utilized by the algorithmic software (enumerated as 908 in FIG. 10) such that each agricultural products (crop inputs) dispensing point 80 or group of dispensing points 80 is map coordinated as stated above and described further herein after. As stated herein above, the aforesaid identification of specific features of the machine and accumulation of associated crop input application data into a database 904 may be accomplished via manual, automatic, or preprogramming methods using product application control system structures and procedures discussed herein adapted with appropriate sensors, metering devices and algorithmic software in accordance with the present invention. Presently, the best mode for implementing the present invention makes use of premeasured application and machine data which is preprogrammed into the algorithmic software data base 904. Once the machine signature process is complete, and each distinct variable rate applicator machine feature and its associated crop input application data have been accumulated in a database 904, the machine can then be put into operation utilizing a "Dead Reckoning" system, or a GPS receiver 52 and/or a radar device 54 to track and anticipate particular field reference points, utilizing machine location, speed, and direction data as shown in blocks 516 and 518. The machine location, speed, and direction data are then stored in the data base 904 as shown in block 520. As stated herein above, any reference to speed means velocity, including speed and instantaneous machine direction. The aforesaid location, speed, and direction data is extracted from the data base 904 in real time to determine ongoing anticipated field reference points for dispensing the desired prescription and quantity of agricultural products crop inputs as shown in block 522. The foregoing process is utilized to complete a signature or machine data base 904 for the machine as it traverses a field. Data sufficient to precisely and accurately determine an appropriate prescription and quantity of crop input to be delivered for each machine dispensing point 80 or groups of dispensing points 80 as well as the time it will take each dispensing point 80 or group of dispensing points 80 to reach a designated anticipated reference point $(T_r)_i$ is then extracted from the data base 904 in real time for use by the host computer 14 to provide the necessary actuator 20, 306, 308 control data shown in blocks 524, 526, and 528. Each product dispensing point 80 or group of dispensing points 80 is then blue printed with its own unique variable dispensing rate for use by an associated controller module 304 as discussed herein before. As the application machine traverses a field, each product storage metering device, transport mechanism metering device, and dispensing point metering device is then actuated in harmony to ensure that the associated dispensing point 80 or group of dispensing points 80 discharges desired crop inputs that may optionally include or be limited exclusively to seeds, at the desired product mix and/or prescriptive quantity at the anticipated locations when the application machine dispensing points 80 arrive at the anticipated locations in the field to be treated. The inventive process and structure can therefore provide individual variable rate control of each distinct crop input dispensing point 80 or group of dispensing points 80 on the variable rate application machine. Specifically, the multi-variable rate dispensing system 50 stores one or more digitized maps of the location of various soil data, e.g. soil type, topographical features, and/or soil characteristics such as nutrient levels, soil compaction, drainage or any other qualifying crop production characteristic, in the field to be treated with desired crop inputs. The multi-variable rate dispensing system 50 is a computerized control system that is responsive to the aforesaid machine location, speed and direction data for determining the location of the machine in the field. The system 50 retrieves the aforesaid data below each individual dispensing point 80 based on its respective location and adjusts the rate and prescription of crop inputs delivered at each dispensing point 80 in response thereto, such that crop inputs can be varied from side to side in a direction transverse to the direction of machine travel.

Figure 6:
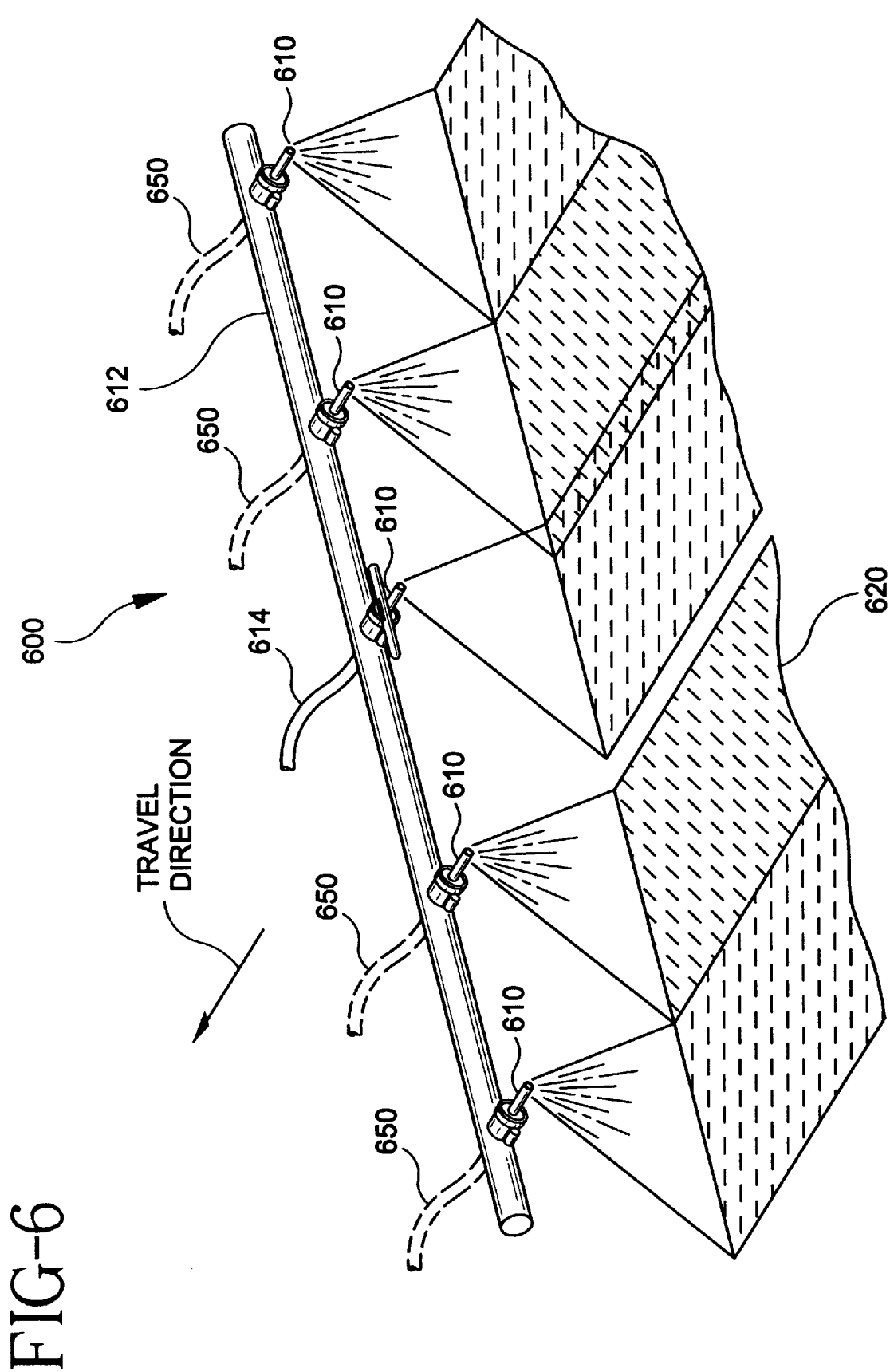
FIG. 6 is a perspective view of a wet boom for spreading a liquid product upon the ground, and which is suitable for use with the present multi-variable rate dispensing system.

FIG. 6 illustrates one embodiment for a wet boom assembly 600 having a plurality of dispensing point 80 spray nozzles 610 attached to a liquid or slurry product carrying manifold 612. The present invention is not limited to use with a wet boom however, and it will be appreciated that a wet boom has been exemplified for ease and clarification when describing one embodiment for the present invention. Wet boom assemblies having a common product supply conduit 614 are known to those familiar with the agricultural industry. The wet boom assembly 600 has a fluid transmitting conduit 614 which couples the agricultural products crop input flow between the crop input storage device, i.e., tank to which it is attached, and the manifold 612. Such structures generally initiate product flow to the boom assembly 600 utilizing a single metered variable rate crop input dispensing scheme which affects each spray nozzle 610 equally. Such methods are undesirable because the crop input prescription and quantity requirements for a field location being treated via one spray nozzle 610 may differ significantly from the crop input prescription and quantity requirements for a different field location simultaneously being treated via a different spray nozzle 610 as the applicator machine traverses the field to be treated. What is desirable and needed in the agricultural industry is a scheme whereby each spray nozzle 610 or group of spray nozzles 610 is attached to its own metered supply conduit as illustrated by combined reference numerals 614, 650. Such a modification of boom system 600 will allow the boom assembly 600 to be adapted for use with the present inventive multi-variable rate dispensing system 50. For example, when a variable rate product application machine is traversing a field on its way to an anticipated field location, the crop input flow through each specific spray nozzle 610 or group of spray nozzles 610 can then be controlled utilizing its own unique dispensing rate scheme to eliminate the effects of unaccounted for and undesirable misapplication of crop inputs through any spray nozzle 610 or group of spray nozzles 610 when dispensing crop inputs at the anticipated field location when each machine dispensing point 80 or group of dispensing points 80 arrives at its respective anticipated location in the field. As stated herein above, the present invention is not limited to use with a wet boom, however. The aforesaid multi-variable rate dispensing system 50 is just as easily adaptable for use with dry boom systems or combinations of dry boom systems and wet boom systems, as well as planters, drills, spinners, drop tubes, injectors, etc. as discussed herein before.

The boom assembly 600 can also be adapted to perform in accordance with the present invention when utilizing a single metered crop input common supply conduit 614 to supply crop inputs to all spray nozzles 610 attached to the boom assembly 600 however. Although the boom assembly 600 utilizing a single common supply conduit 614 provides a common supply of crop input to each spray nozzle 610, each individual spray nozzle 610 can utilize an adjustable orifice which is controlled via the present multi-rate dispensing system 50 using the inventive process shown in FIG. 5 and described herein to establish a unique variable dispensing rate. One such adjustable orifice spray nozzle suitable for use with the present invention is described in U.S. patent application Ser. No. 08/513,335, to Monson, filed Aug. 10, 1995, and entitled *Variable Orifice Self-Adjusting Nozzle*. This application (Ser. No. 08/513,335) is assigned to the assignee of the present invention and incorporated by reference in its entirety herein.

Figure 7:
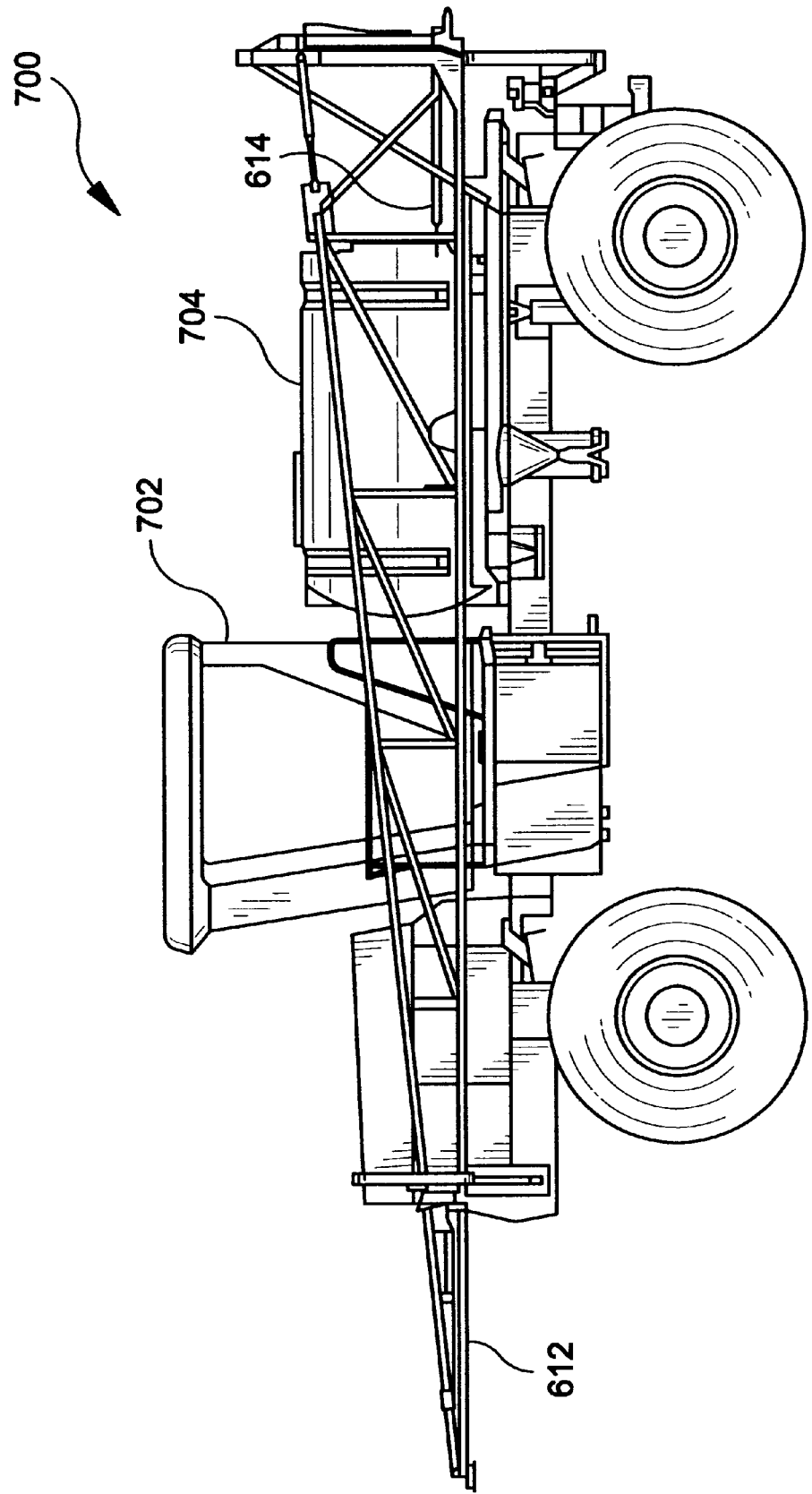
FIG. 7 is a side view of a product application machine having a product storage tank and a wet boom such as that illustrated in FIG. 6, and which is adaptable for use with the present multi-variable rate dispensing system shown in FIG. 1.

Moving now to FIG. 7, a side view of a common product application machine 700 familiar to those skilled in the agricultural industry, and having a product storage tank 704 and a wet boom assembly 600 such as that illustrated in FIG. 6, and which is adaptable for use with the present inventive multi-variable rate dispensing system 50 is illustrated. Agricultural products (crop inputs) stored in the tank 704 are supplied to the boom manifold 612 via the supply conduit 614, as stated above. As stated herein before, the machine 700 may be adapted for use with the present invention simply by providing the machine 700 with a metered supply conduit 614, 650 which is unique to each spray nozzle 610 or group of spray nozzles 610, or alternatively, by utilizing a single common supply conduit 614 to supply individually controllable variable orifice spray nozzles 610. Such nozzle 610 control will, relative to predetermined data, allow for variable input control in the horizontal plane from one side to the other, either by section control (several spray nozzles 610 grouped together) or through individual spray nozzle 610 control.

Figure 8:
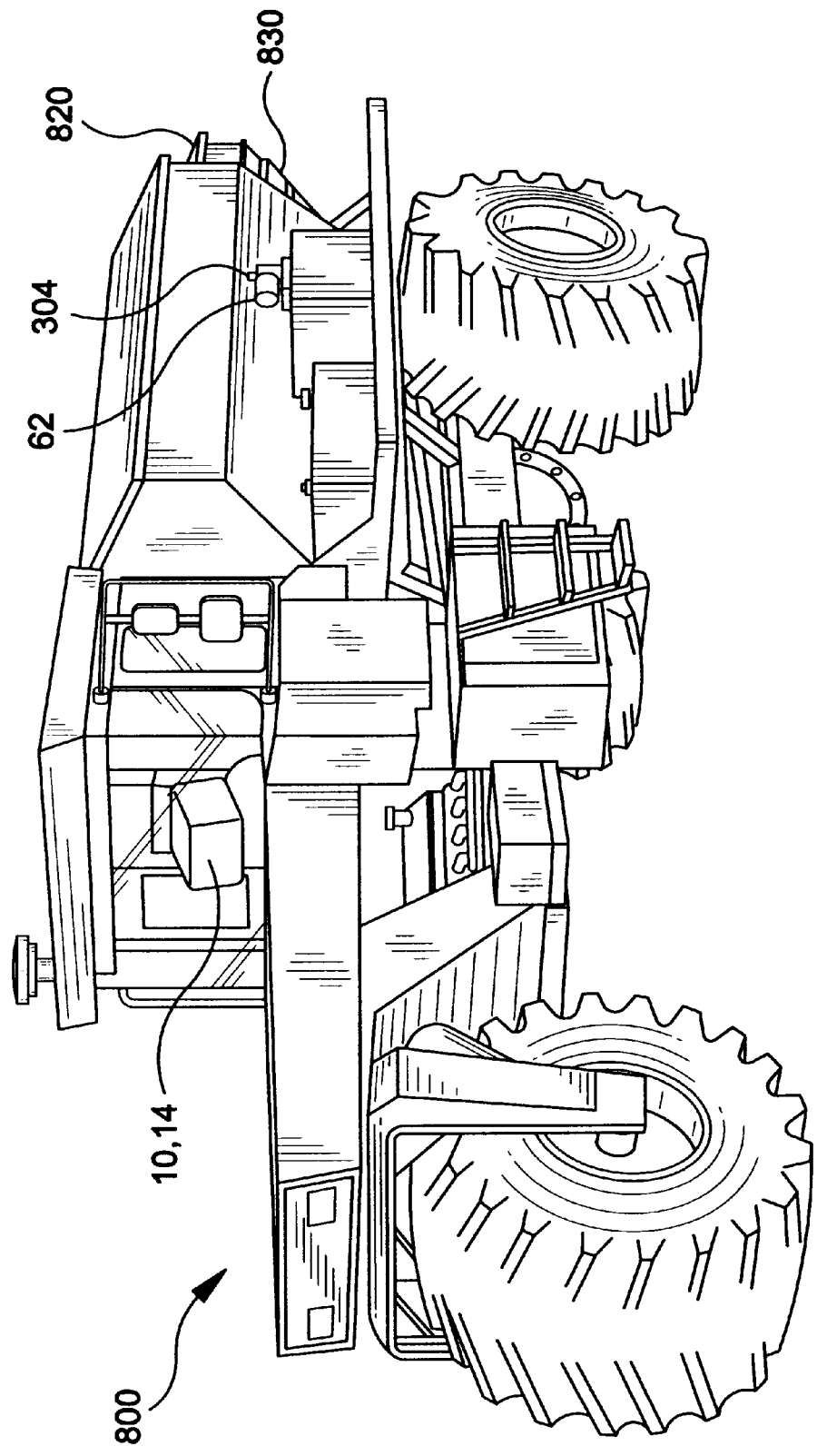
FIG. 8 is a perspective view of a product application machine having a multi product box suitable for applying crop inputs at variable rates and which is adaptable for use with the present multi-variable rate dispensing system shown in FIG. 1.
Figure 9:
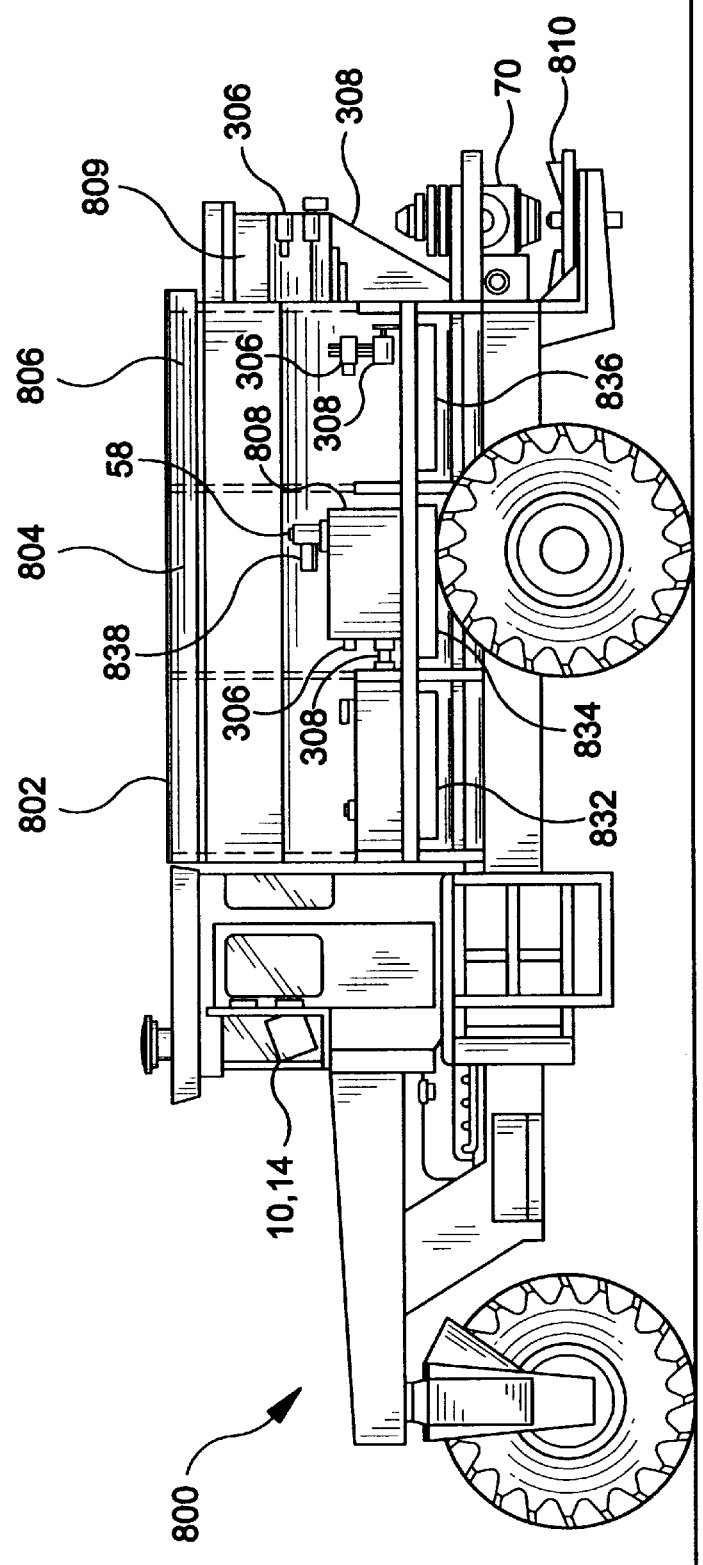
FIG. 9 is a detailed side view of the crop input application machine having a multi product box illustrated in FIG. 8.

Another type of product application machine 800 known to those familiar with the agricultural industry, having multiple product storage bins 802, 804, 806, 808, 809 and a spreading wheel 810 is illustrated in FIGS. 8 and 9. Such machines are compatible for use with computerized control systems such as described in the '773, Re '100, and '924 patents discussed herein above and incorporated by reference in their entirety herein. Generally, a host computer 14 is used in combination with a monitor 10 such as a CRT which is located within the operator cab 702 for use by a machine operator to move the machine 800 to an anticipated location in a field to dispense desired product mixes and/or prescriptive quantities of product when the machine 800 reaches the anticipated location in the field. A more detailed side view of the product application machine 800 is depicted in FIG. 9. The embodiment illustrated includes multiple storage bins 802, 804, 806, 808, 809 for storing a plurality of planting or crop input products, or alternatively for storing identical products chained together via storage bin 802, 804, 806, 808, 809 interconnecting devices which allow the application machine to switch back and forth between desired bins storing the same product during the spreading process. Systems such as the ones depicted in FIGS. 7, 8 and 9 have not yet been adapted by those skilled in the art to consider and control individual crop input metering of each dispensing point 80 or group of dispensing points 80 attached to the application machine to independently vary the crop input delivery rate horizontally transverse to the linear direction of application machine travel. Variable rate application techniques have historically been limited to use of a single composite estimated or average variable dispensing rate for the application machine viewed overall as a single dispensing point traversing a field, regardless of the location and number of dispensing points actually attached to the machine. None of the known variable rate crop input applicator machines incorporate structures and/or methods even remotely similar to the present multi-variable rate dispensing system 50 to individually control the rate and/or prescription of crop inputs being dispensed in a horizontal plane from one side to the other at each distinct dispensing point 80 or group of dispensing points 80 attached to the variable rate applicator machine. As stated herein before, single variable rate control structures and methods are known by the present inventor to be significantly less than optimum. Known product application machines 700, 800 incorporating multiple crop inputs, crop input storage devices, release points 830, 832, 834, 836, 838, dispensing points 80, and/or material transport devices 70 will not accurately and precisely dispense all crop inputs to be delivered at every dispensing point 80 or group of dispensing points 80 on a machine as the machine traverses the field, due to the inability of such known systems to individually control the variable rate of crop input delivered at each dispensing point 80 or group of dispensing points 80. Therefore, the present invention provides a system and process for accurately and precisely delivering specific blends and/or prescriptive quantities of seeds, fertilizers, chemicals, or other crop input products to anticipated reference locations in a field as a function of a multi-variable rate dispensing scheme which more accurately characterizes and compensates for the effects attributed to the spreading process by a plurality of dispensing point 80 variables associated with a particular machine. The present invention thus provides a system and method of customizing any variable rate agricultural products (crop inputs) application or spreading machine, powered or towed, based on the particular machine signature or identity, to enable accurate and precise crop input applications in a horizontal plane substantially transverse to the direction of machine travel.

FIG. 10 is a simplified block diagram illustrating implementation of the present multi-variable rate dispensing system 50 on board a SOILECTION® machine 902 having a FALCON® variable rate control system 200 manufactured by Ag-Chem Equipment Company, Inc. of Minnetonka, Minn. The SOILECTION® machine 902 is described in detail in U.S. patent application Ser. No. 08/452,894 by Hauwiller et al., which is assigned to Ag-Chem Equipment Company, Inc. of Minnetonka, Minn., and incorporated by reference herein in its entirety. The invention is implemented to enhance a resident data base 904, such as for example, a geographical information system (GIS) like the SOILECTION® Geographical Information System (SGIS), also manufactured by Ag-Chem Equipment Company, Inc. of Minnetonka, Minn., and to provide accurate data to application programs for use by the FALCON® (Fertilizer Applicator Local Control Operating Network) Control System 200. This implementation of the invention includes use of a Global Positioning System (GPS) having a GPS receiver 52 and an associated data processor, such as described herein above. The GPS receiver 52 and data processor are hosted by the SOILECTION® machine 902. Generally, the GPS system is initiated when the receiver 52 starts to track pseudo-random noise from a group of satellites and generates time of arrival times for an anticipated field reference point by the product application machine. Thereafter, the GPS data processor 52 takes over. A more complete discussion of GPS operation is found in U.S. Patent Application by Robert J. Monson, entitled *AUTOMATIC TOPOGRAPHICAL MODEL GENERATION METHOD AND APPARATUS,* filed Jan. 22, 1996, and incorporated by reference herein in its entirety as stated herein above.

Accordingly, the SOILECTION® machine 902 receives GPS data which information is integrated with the multi-variable rate dispensing data, e.g. digitized data map, determined and stored in a data base 904 as illustrated in FIGS. 5 and 10, and discussed in detail herein before to establish the exact moments in time machine dispensing point 80 actuator devices 20, 306, 308 and any associated metering devices 56, 58, 60, 62 must be activated to accurately and precisely apply the desired planting and/or crop input products as the SOILECTION® machine 902 traverses the field. The multi-variable rate dispensing data is integrated with the SOILECTION® machine 902 controls through the FALCON® system 200. The FALCON® system 200 includes the FALCON® software system 908. The subdirectories of the FALCON® software 908 include: FALCON® 910 which functions as host system and interface; net utility system 920 which functions as a network utilities and diagnostics software; network firmware 930 in which a downloadable code such as Neuron C® resides, and GPS interface system 940 which is a dedicated section of the software dealing with GPS data reception and processing. More detailed descriptions of specific FALCON® system 200 applications are disclosed in the '924 patent referenced above, as well as U.S. Patent Application by Robert J. Monson, entitled *INTELLIGENT MOBILE PRODUCT APPLICATION CONTROL SYSTEM,* filed Dec. 13, 1995, and U.S. Patent Application by Robert J. Monson, entitled *PRODUCT APPLICATION CONTROL WITH DISTRIBUTED PROCESS MANAGER FOR USE ON MACHINES,* filed Jan. 24, 1996, all incorporated by reference in their entirety herein.

As may be readily understood from FIG. 10, the multi-variable rate dispensing system 50 acquires multi-variable rate dispensing system data, e.g. digitized map data, which is stored in a data base 904 as described above, and interacts with the FALCON® system 200 to automatically determine and implement the precise dispensing rates for each dispensing point 80 or group of dispensing points 80 in the product flow stream independently of any other dispensing point 80 or group of dispensing points 80 in the product flow stream, thereby further enhancing the automation, precision and accuracy of site-specific farming.

Figure 11:
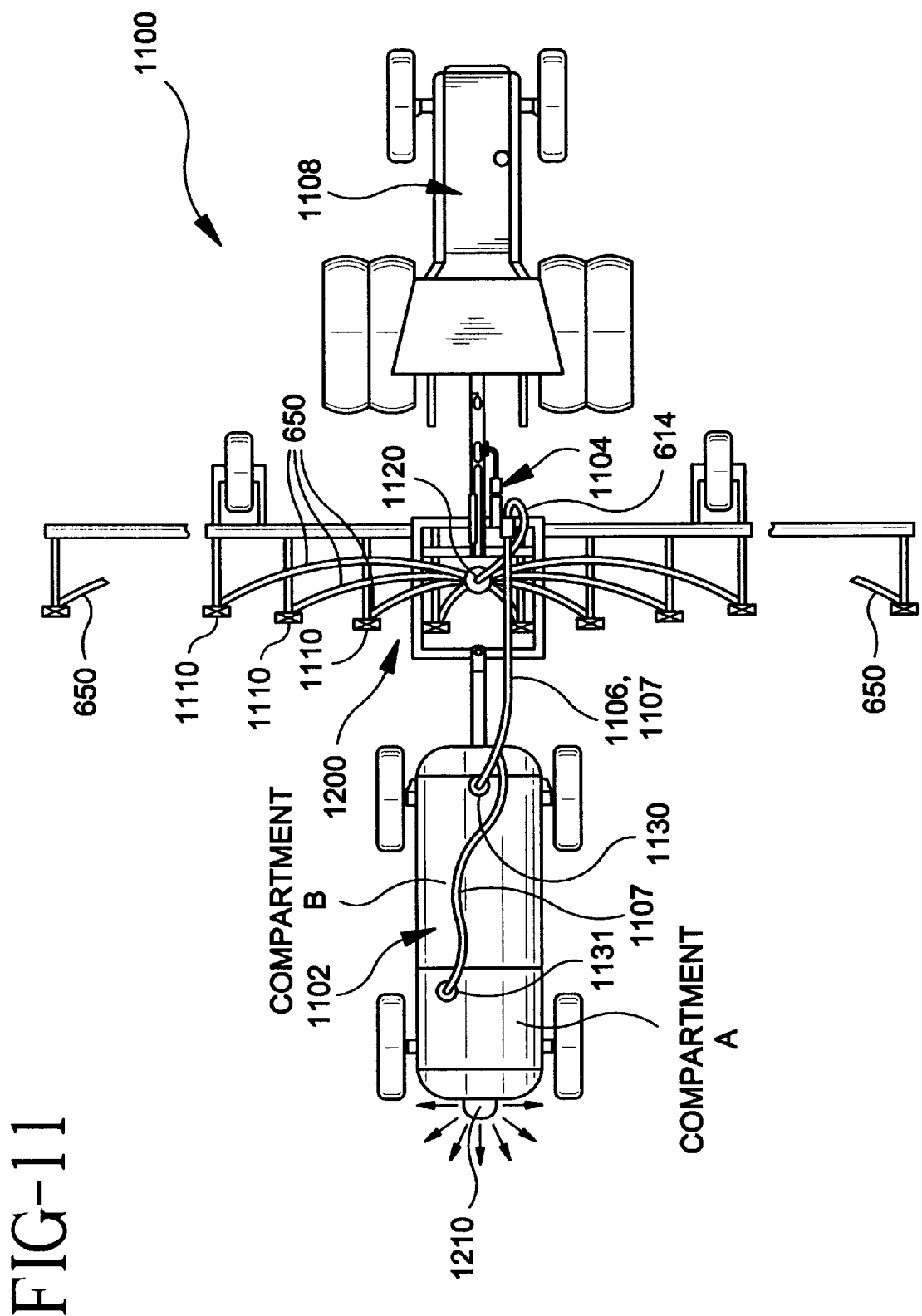
FIG. 11 is a top view of a multiple combination crop input application system suitable for use with the present multi-variable rate dispensing system.

Looking now at FIG. 11, one embodiment of a multiple combination crop input applicator machine system enumerated as 1100 which can be adapted for use with the present inventive multi-variable rate dispensing system 50 is illustrated. The multiple combination crop input applicator machine system 1100 includes a powered vehicle 1108 such as a tractor, but could just as well be a crop input application vehicle such as a TERRA-GATOR® machine with a fertilizer application system attached as manufactured by Ag-Chem Equipment Company, Inc. of Minnetonka, Minn. or a Lor*A1 chassis with an Air-Max® system attached as manufactured by Lor*A1 Products, Inc. of Benson, Minn., or any other type of crop input applicator machine, for example. System 1100 has a single point hitch crop input application system indicated generally at 1104, including a crop input storage tank 1102, a cultivator, and a tool bar or other implement 1200. A crop input supply hose 1106, 1107 leading from a metering valve 1130, 1131 on multi-product storage tank 1102 supplies one or more crop inputs to a metering valve 1120 for distribution to individual spray nozzles or other dispensing point elements 1110 via supply hoses 650. A spreader device 1210 is shown generally attached to the rear end of multi-product storage tank 1102 and is adapted to spread a selected crop input over the ground surface as the system 1100 traverses a field to be treated. The storage tank 1102 can be used for storing any crop input or combination of crop inputs such as phosphate fertilizer, anhydrous ammonia, or any other crop input such as discussed herein before. The present invention is applicable for use with single or multiple compartment tanks however. A multiple compartment tank 1102 having two or more individual compartments (depicted as "A" and "B" in FIG. 11) can be easily adapted for use with the present multi-variable rate dispensing system 50. Each metering device 1120, 1130, 1131, spreader device 1210, and any dispensing point devices 1110 can then be individually controlled via actuator mechanisms 20, 306, 308 such as depicted in FIGS. 3 and 4 utilizing multi-variable rate dispensing system 50 and associated algorithmic methods described herein before to ensure each crop input to be dispensed at a designated field reference point will be combined to achieve the desired prescription and quantity of crop inputs based upon formerly measured conditions and values at the designated field reference point.

Figure 12:
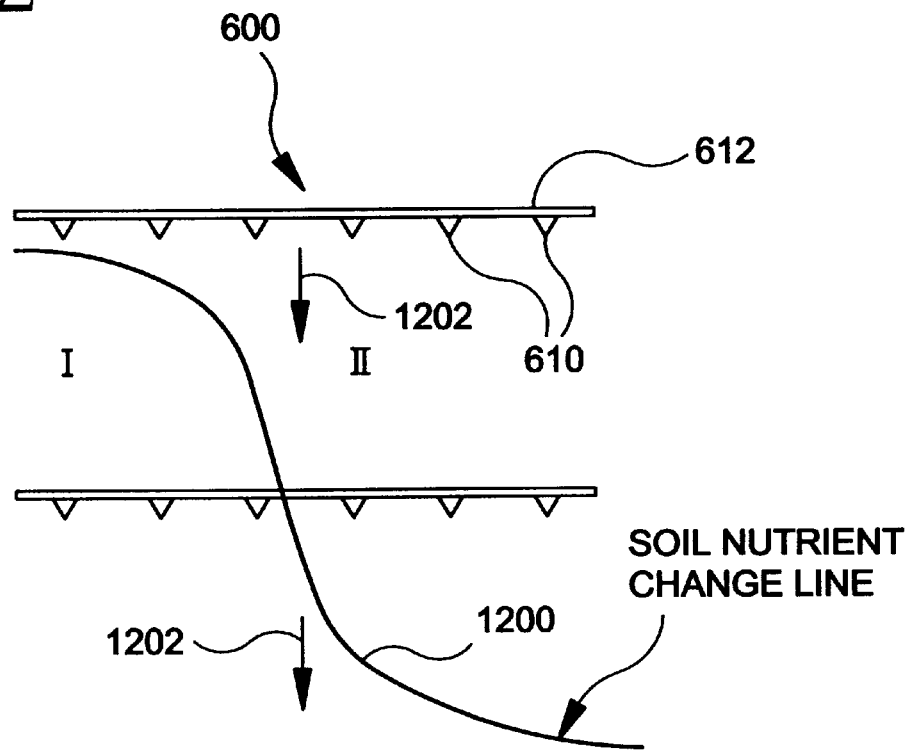
FIG. 12 illustrates a boom assembly using the present variable rate dispensing system to deliver crop inputs over a geographic area exhibiting changes in soil nutrient levels.

Moving on to FIG. 12, a boom assembly 600 is shown using the present variable rate dispensing system to deliver crop inputs over a geographic area exhibiting changes in soil nutrient levels. Farm fields typically exhibit soil nutrient change lines 1200 which may be represented by a map of the field conditions determined from soil sample data taken at predetermined points in the field. As the boom assembly 600 traverses the field to be treated in the direction shown by the arrows 1202, it is desirable that each dispensing point nozzle 610 deliver the desired prescription and quantity of crop inputs required of the respective area being treated. With reference to FIG. 12, it can be seen that as boom assembly 600 begins to traverse the field, each nozzle 610 is treating the field area designated by Roman numeral II. In area II, each spray nozzle 610 is required to dispense crop inputs at the same rate. Present variable rate application systems are capable of performing this task since these prior art systems control the dispensing rate in a manner such that all spray nozzles 610 attached to the boom 612 deliver crop inputs at the same rate. As the boom assembly 600 continues to traverse the field in the direction of the arrows 1202, the boom assembly begins to cross the soil nutrient change line 1200. When this condition occurs, some spray nozzles 610 enter into the field area designated by Roman numeral I. It can be seen that the spray nozzles 610 treating field area I will be required to dispense crop inputs at a different dispensing rate than the spray nozzles 610 simultaneously treating field area II. Present variable rate application systems are not capable of performing this task since these prior art systems are capable of dispensing crop inputs at only a single variable dispensing rate common to all dispensing point nozzles 610 at any single moment in time. The present invention however, is capable of simultaneously treating field areas I and II, since the present inventive multi-variable rate dispensing system will independently vary the dispensing rate of crop inputs for each spray nozzle or group of spray nozzles simultaneously. Therefore, the present invention will perform the required task of treating field area I at a first required dispensing rate while simultaneously treating field area II at a second required dispensing rate as the multi-variable rate dispensing system 50 traverses the field to be treated.

Figure 13:
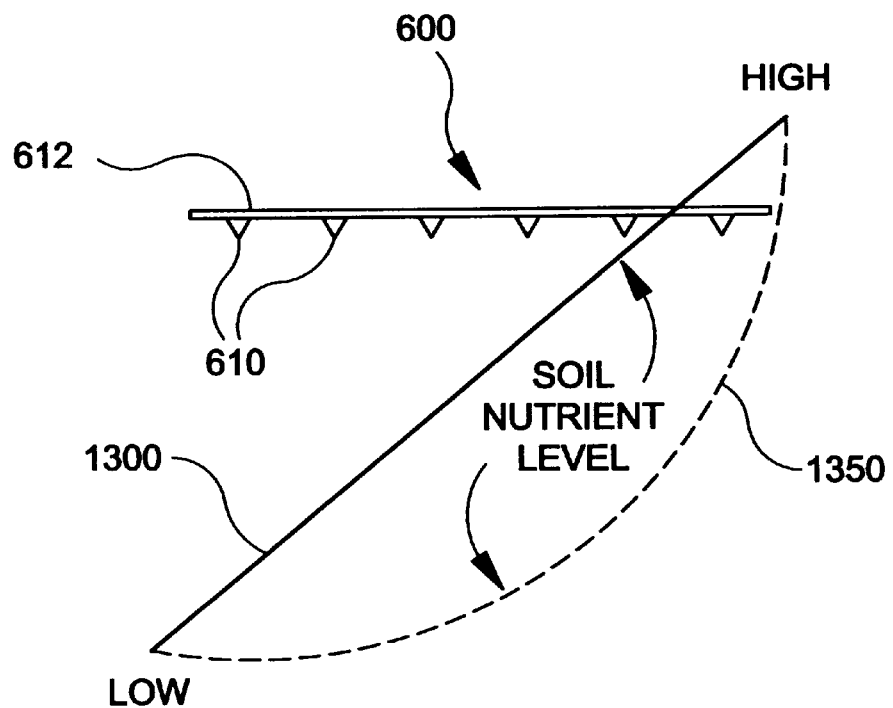
FIG. 13 is another illustration showing a boom assembly using the present variable rate dispensing system to deliver crop inputs over a geographic area exhibiting changes in soil nutrient levels.

FIG. 13 is another illustration showing a boom assembly 600 using the present multi-variable rate dispensing system 50 to deliver crop inputs over a geographic area exhibiting changes in soil nutrient levels. With reference to FIG. 13, it can be seen that in addition to the soil nutrient change line exhibited in FIG. 12, a particular geographic area can also exhibit actual soil nutrient level changes which may occur differently for one field area (e.g. area I) than that which occurs for another field area (e.g. area II, for example. When this condition occurs, it can be seen that one end of a spray boom 612 can be required to dispense crop inputs over a field area in which the soil nutrient level is low, while simultaneously being required to dispense crop inputs over a field area in which the soil nutrient level is much higher. In fact, field conditions can exist in which the soil nutrient level is so high as not to require any crop input treatment whatsoever. Additionally, it can also be seen that any individual spray nozzle 610 attached to a spray boom 612 can be simultaneously required to dispense crop inputs at a rate which is considerably different than the dispensing rate for any other spray nozzle 610 attached to the spray boom 612. The soil nutrient level enumerated as line 1300 in FIG. 13 illustrates a linear nutrient level change while the line enumerated as 1350 exhibits a nonlinear change in soil nutrient level for a particular geographic area. Some skilled in the art have attempted to use feathering techniques when confronted with soil conditions exhibiting linear changes in nutrient levels. However, nonlinear changes in nutrient levels have continued to perplex those skilled in the art, as apparatus and methods to accurately and precisely treat such nonlinear changes in soil characteristics have presently remained unknown until this moment with the present invention. The present invention elevates the state of the art in variable rate application apparatus and methods such that each dispensing point 80, e.g. spray nozzle 610 or group of dispensing points 80 attached to a spray boom 612 can dispense crop inputs at a unique variable dispensing rate independent of any other spray nozzle 610 or group of spray nozzles 610 attached to the same boom assembly 600. Therefore, linear as well as nonlinear changes in soil characteristic, e.g. nutrient levels, such as those exhibited in FIGS. 12 and 13 can now be accurately and precisely managed with the prescription and quantity of crop inputs required at each distinct field site exhibiting such conditions.

This invention has been described herein in considerable detail in order to comply with the patent statutes and to provide those skilled in the art with the information needed to apply the novel principles and to construct and use such specialized components as are required. In view of the foregoing descriptions, it should be apparent that the present invention represents a significant departure from the prior art in construction and operation. Further it provides for improving the quality of crop yield and affords a more environmentally desirable approach to site-specific farming by eliminating or significantly reducing inaccuracies and imprecision during planting or application of crop inputs to a field. However, while a particular embodiment of the present invention has been described herein in detail, it is to be understood that various alterations, modifications and substitutions can be made therein without departing from the spirit and scope of the present invention, as defined in the claims which follow. For example, it will be apparent to those skilled in the agricultural industry that although particular storage devices, crop input transport mechanisms, crop input release points and dispensing points 80 have been illustrated, that many other storage devices, crop input transport mechanisms, release points and dispensing points 80 will also work in conjunction with the present invention to provide the intended functions of accurately and precisely controlling the variable rate of crop inputs dispensed at each individual dispensing point 80 independent of any other dispensing point 80 on board a variable rate application machine to enhance the accuracy of product delivery to anticipated reference points in a field. It will also be understood that the present invention will also work with any multiple combination of powered and/or towed crop input variable rate applicator machines including side-by-side combinations and tandem combinations, to ensure a desired prescription and quantity of crop inputs is delivered to an exact field point based upon formerly measured conditions and values at that exact field point, as the multiple combination of crop input variable rate applicator machines traverse a field to be treated.

Although the present invention has been described with reference to preferred embodiments, workers skilled in the art will recognize that changes may be made in form and detail without departing from the spirit and scope of the invention.

What is claimed is:

1. An agricultural system for application of seeds to a field, the system comprising:
   a vehicle;
   a seed dispensing system having a plurality of seed dispensing points associated with the vehicle;
   a positioning system for determining position of the vehicle in the field; and
   a control system for controlling operation of the seed dispensing system as a function of position of the vehicle in the field and a map which defines desired seed variety and dispensing rate information for specific field reference points, where the control system knows a location of each dispensing point associated with the vehicle such that each dispensing point is controlled independent of other dispensing points and delivers a desired seed variety at a desired dispensing rate that varies based on the location of each dispensing point relative to the field reference points.

2. A planter for dispensing seeds over a desired land area, the planter comprising:
   a plurality of seed dispensing points; and
   a control system that knows a position of each dispensing point such that the control system individually controls seed variety and seed dispensing rate at each of the plurality of dispensing points based upon the position of each dispensing point with respect to the desired land area.

3. A planter comprising:
   a plurality of seed dispensing points;
   a plurality of actuators operatively coupled to selected seed dispensing points;
   a positioning system for anticipating a field reference point and generating anticipated field reference point data in real time as the planter traverses a field; and
   a dispensing control system that knows a position of each seed dispensing point such that the control system controls the actuators as a function of the anticipated field reference point data and position of the respective seed dispensing points on the planter in a direction transverse to a direction of travel of the planter so that dispensing of seeds at each seed dispensing point can vary from dispensing of seeds at another dispensing point.

4. The planter of claim 3 wherein the dispensing control system individually controls seed variety dispensed at each dispensing point.

5. The planter of claim 3 wherein the dispensing control system individually controls seed dispensing rate at each dispensing point.

6. A method of dispensing seeds to a predetermined geographic land area, the method comprising:
   causing a planter having a plurality of seed dispensing points to travel over a desired surface area of the geographic land area;
   inputting a position of each seed dispensing point on the planter:
   determining an anticipated field reference point in real time;
   individually controlling dispensing of seeds at each dispensing point as a function of digital map data, the anticipated field reference point, and the position of each dispensing point on the planter, such that dispensing of seeds is controlled in a direction transverse to a direction of travel of the planter so that dispensing of seeds at each seed dispensing point can vary from dispensing of seeds at another dispensing point.

7. The method of claim 6 wherein individually controlling dispensing of seeds includes individually controlling seed variety dispensed at each dispensing point.

8. The method of claim 6 wherein individually controlling dispensing of seeds includes individually controlling seed dispensing rate at each dispensing point.

9. A method of dispensing seeds to a predetermined geographic land area comprising:
   causing a planter having a plurality of seed dispensing points to travel over a desired surface area of the geographic land area;
   inputting a location of each seed dispensing point on the planter:
   determining an anticipated field reference point in real time;
   providing a map of seed dispensing information as a function of location of each dispensing point within said plurality of crop input dispensing points; and
   utilizing the seed dispensing information and the anticipated field reference point to individually control selected dispensing points so that dispensing of seed may vary in a direction substantially transverse to a direction of planter travel.

10. A method of dispensing seeds to a predetermined geographic land area, the method comprising:
    causing a planter having a plurality of seed dispensing points to travel over a desired surface area of the geographic land area;
    inputting a position of each seed dispensing point on the planter:
    determining an anticipated field reference point in real time;
    individually controlling dispensing of seeds at each dispensing point as a function of digital map data, the anticipated field reference point, and the position of each dispensing point on the planter, such that seed variety and seed dispensing rate are individually controlled at each dispensing point.

* * * * *